United States Patent [19]

Suzuki et al.

[11] 3,820,797

[45] June 28, 1974

[54] PHONOGRAPH RECORD CHANGER

[75] Inventors: Norihiro Suzuki, Saitama-ken; Kazuyuki Takizawa, Tokyo, both of Japan

[73] Assignee: Sony Corporation, Tokyo, Japan

[22] Filed: Oct. 22, 1971

[21] Appl. No.: 191,765

[30] Foreign Application Priority Data

Oct. 24, 1970 Japan ............................ 45-93656

[52] U.S. Cl. ............................................ 274/10 S
[51] Int. Cl. ............................................ G11b 17/16
[58] Field of Search ......................... 274/10 R, 10 S

[56] References Cited

UNITED STATES PATENTS

| | | | |
|---|---|---|---|
| 3,133,736 | 5/1964 | Bodenroder | 274/10 S |
| 3,254,896 | 6/1966 | Dennis | 274/10 R |
| 3,288,471 | 11/1966 | Weedfall | 274/10 S |
| 3,305,238 | 2/1967 | Carlson | 274/10 R |
| 3,507,503 | 4/1970 | Freier | 274/10 R |

FOREIGN PATENTS OR APPLICATIONS

| | | | |
|---|---|---|---|
| 1,029,075 | 5/1966 | Great Britain | 274/10 R |

*Primary Examiner*—Harry N. Haroian
*Attorney, Agent, or Firm*—Lewis H. Eslinger, Esq.; Alvin Sinderbrand, Esq.

[57] ABSTRACT

In a phonograph record changer having a spindle assembly for supporting a stack of records at an elevated storage position above the path of the tone arm in moving across the turntable; record changing is accomplished by the controlled movement of the lowest record in the stack, preferably with any other records in the stack, to an intermediate position which is spaced from the elevated storage position by at least substantially one-half of the distance from the elevated storage position to the turntable surface, whereupon the lowest record is released to drop onto the turntable from a relatively short distance thereabove for avoiding damage to the records. During record changing, rotation of the turntable is temporarily halted while the turntable motor continues to operate for rapid return to normal turntable speed at the conclusion of a record changing cycle. The record changer further permits repeat playing of any selected record in the stack, or, if desired, the shutting-off of the record changer at the completion of the play of a record on the turntable even though one or more records remain on the spindle.

21 Claims, 25 Drawing Figures

PATENTED JUN 28 1974 3,820,797

SHEET 01 OF 16

INVENTORS
NORIHIRO SUZUKI
KAZUYUKI TAKIZAWA

BY

ATTORNEY

INVENTORS

NORIHIRO SUZUKI

KAZUYUKI TAKIZAWA

BY

ATTORNEY

INVENTORS
NORIHIRO SUZUKI
KAZUYUKI TAKIZAWA

BY

ATTORNEY

INVENTORS
NORIHIRO SUZUKI
KAZUYUKI TAKIZAWA

BY

ATTORNEY

PATENTED JUN 28 1974 3,820,797

SHEET 05 OF 16

INVENTORS
NORIHIRO SUZUKI
KAZUYUKI TAKIZAWA

BY

ATTORNEY

INVENTORS

NORIHIRO SUZUKI
KAZUYUKI TAKIZAWA

BY

ATTORNEY

INVENTORS
NORIHIRO SUZUKI
KAZUYUKI TAKIZAWA

BY

ATTORNEY

INVENTORS
NORIHIRO SUZUKI
KAZUYUKI TAKIZAWA
BY
ATTORNEY

INVENTORS
NORIHIRO SUZUKI
KAZUYUKI TAKIZAWA

BY

ATTORNEY

INVENTORS
NORIHIRO SUZUKI
KAZUYUKI TAKIZAWA

BY

ATTORNEY

INVENTORS
NORIHIRO SUZUKI
KAZUYUKI TAKIZAWA

BY

ATTORNEY

INVENTORS
NORIHIRO SUZUKI
KAZUYUKI TAKIZAWA

BY

ATTORNEY

INVENTORS
NORIHIRO SUZUKI
KAZUYUKI TAKIZAWA

BY

ATTORNEY

INVENTORS

NORIHIRO SUZUKI

BY KAZUYUKI TAKIZAWA

ATTORNEY

INVENTORS
NORIHIRO SUZUKI
KAZUYUKI TAKIZAWA

BY

ATTORNEY

INVENTORS
NORIHIRO SUZUKI
KAZUYUKI TAKIZAWA

BY

ATTORNEY

PHONOGRAPH RECORD CHANGER

This invention relates generally to phonograph record changers, and more particularly to record changers of the type in which a stack of phonograph records is supported on a spindle assembly at a level above the turntable, and the lowest record in the stack is separated from the remainder of the stack and moved downwardly onto the turntable in response to each record changing operation.

In phonograph record changers of the described type, the level of the elevated position at which the stack of records is normally supported on the spindle assembly is a substantial distance above the turntable so that the lowest record in the stack will be disposed above the path of travel of the tone arm and pickup as the latter moves radially inward over a record during playing of the latter and also above the elevated outwardly directed path in which the tone arm and pickup move upon completion of the playing of each record on the turntable. In some existing record changers, for example, as disclosed in U.S. Pat. No. 3,257,114, issued June 21, 1966, to H. C. Hansen, record changing is affected by releasing the lowest record in the stack at the elevated storage position and simultaneously gripping the next to the lowest record so that the released lowest record falls, under the influence of gravity, the substantial distance onto the turntable and the remainder of the stack is retained at the elevated storage position. With such an arrangement, the free fall or dropping of the released record through the substantial distance from its original elevated position to the surface of the turntable is likely to cause damage to the records and further produces a large impact that results in undesirable noise and in vibrations of the record changer.

In order to avoid the above problems, it has been proposed, for example, in U.S. Pat. No. 3,336,032, issued Aug. 15, 1967, to R. J. Hammond, to support the lowest record in the stack as such record is moved downwardly onto the turntable from the remainder of the stack retained at the elevated storage position, and to release the downwardly moved record only after the same is positioned on the turntable. Although such arrangement ensures gentle handling of each record, it has the following inherent disadvantages:

The movement of the record from the elevated storage position onto the turntable is relatively slow so that the time required for a record changing operation is undesirably time consuming;

The record supporting means, which engage the lowest record in the stack and support the same during its movement from the elevated storage position onto the turntable, necessarily move through a relatively large distance and, therefore, problems arise as to the space required for the operating mechanism which effects the necessary large movements of the record supporting means; and When the lowest record in the stack is supported by fingers which are pivoted inside the hollow spindle and resiliently urged to project through longitudinal slots in the spindle wall, with the fingers being retracted into the spindle to release the supported record in response to the engagement of the fingers with the bottom ends of the respective slots which are disposed below the level of the turntable surface, difficulty is experienced in preventing the movement of the fingers to their projecting operative positions upon the initiation of the upward return of the fingers toward the elevated storage position, that is, the fingers tend to lift a record or records from the turntable at the initiation of their return toward the elevated storage position.

The last of the disadvantages mentioned above has been recognized, for example, in U.S. Pat. No. 3,241,839, issued Mar. 22, 1966, to J. L. D. Morrison, in which it is proposed that, after the record supporting fingers have been moved downwardly to the full extent and retracted to release a record on the turntable, the fingers are rotated out of alignment with the respective slots and then raised toward the elevated storage position while being retained in their retracted positions through engagement with the inner wall surface of the hollow spindle. Upon return of the record supporting fingers to the elevated storage position, the fingers are again rotated about the spindle axis for alignment with the respective slots so that the fingers can then project through the slots and assume the support of the record stack. However, the foregoing arrangement undesirably complicates the mechanisms required for operating the spindle assembly during record changing operations. Further, the rotary movements of the fingers about the spindle axis out of, and into alignment with the respective slots give rise to the possibility of faulty operation. For example, in the event of any wear or play in the mechanism for effecting such rotary movements, the fingers may not be returned to positions in precise alignment with the respective slots so that one or more of the fingers may not project through the respective slots at the elevated storage position with the result that, when the fingers are to assume the support of the record stack at the storage position, the stack may tilt or not be supported at all.

Further, in record changers of the type disclosed in U.S. Pat. Nos. 3,241,839 and 3,336,032, identified more fully above, the secondary record support means, which retains the remainder of the record stack at the elevates storage position while the primary record support means transports the lowest record through the substantial distance onto the turntable surface and then returns to the elevated storage position, must therefore assume the load of the remainder of the record stack for an inordinately long period. However, in record changers of the type described, the secondary record support means can have only a relatively tenuous grip within the central hole of the record next above the record being transported to the turntable surface and it is desirable to minimize the period during which such secondary record support means assumes the considerable weight of the record stack.

It has also been proposed, for example, in U.S. Pat. No. 3,288,471, issued Nov. 29, 1966, to W. C. Weedfall, to provide a record changer capable of use with a stack of intermixed records of various diameters, and in which, during a record changing operation, the lowest record in the stack is moved downwardly a small distance from the elevated storage distance to permit the tone arm to feel and gauge the size of that record and correspondingly adjust the operating mechanisms for the proper positioning of the tone arm set down, whereupon the tone arm returns to its extreme outward position and the primary record support means releases the lowest record to drop the substantially large distance that remains to the turntable surface. Thus, the foregoing arrangement has substantially the same disadvantage as has been described above with reference to the record changer disclosed in U.S. Pat. No. 3,257,114.

Accordingly, it is an object of this invention to provide an improved phonograph record changer which is free of the above described disadvantages of previously proposed record changers.

More specifically, it is an object of this invention to provide a phonograph record changer which is capable of the gentle handling of the records and which achieves its record changing cycle in a relatively short time period.

Another object is to provide a record changer, as aforesaid, in which, when desired, any record in the stack may be repeatedly played, as distinguished from existing record changers in which repeat playing is possible only with respect to the last, or topmost record of the stack.

Still another object is to provide a record changer, as aforesaid, in which, during each record changing cycle, turntable rotation is arrested to avoid damage to the record being transferred from the stack onto the turntable.

Still another object is to provide a record changer, as aforesaid, in which turntable rotation is arrested during each record changing cycle by the mechanical actuation of a brake and by the mechanical disengagement of an idler assembly interposed between the turntable and the motor for driving the latter, so that the turntable motor remains operative during the record changing cycle for rapidly restoring the turntable to normal speed at the conclusion of that cycle.

A further object is to provide a record changer, as aforesaid, in which, if desired, operation of the record changer can be concluded at the completion of the playing of a record on the turntable even though one or more records remain in the stack at the elevated record storage position.

In accordance with an aspect of this invention, a spindle assembly projecting upwardly from the center of the turntable and adapted to extend through the center holes of a stack of records is provided with first or primary record support means engageable with the lowest record in a stack to normally support the same at an elevated storage position a substantial distance above the turntable, and with second or secondary record support means engageable with the next to the lowest record in the stack for supporting the latter when the lowest record is separated downwardly from said next record, and the first or primary record support means is moved downwardly, while continuing to engage the lowest record, from the elevated storage position to an intermediate position which is spaced from the elevated storage position by at least substantially one-half the distance from the elevated storage position to the turntable surface, whereupon, the first or primary record support means is released at the intermediate position to free the lowest record to fall the remaining short distance to the turntable surface.

It is preferred that the spindle assembly be movable vertically, as a unit, with respect to the turntable so that the downward movement of the primary record support means to the intermediate position is accomplished by corresponding downward movement of the spindle assembly, from which it follows that all records in the stack move downwardly with the lowest record when the latter is moved from the elevated storage position to the intermediate position. Thus, the secondary record support means only come into engagement with the next to the lowest record at the intermediate position as the lowest record is released by the primary record support means.

The above, and other objects, features and advantages of the invention, will be apparent in the following detailed description of an illustrative embodiment which is to be read in connection with the accompanying drawings, wherein.

Figure 1:
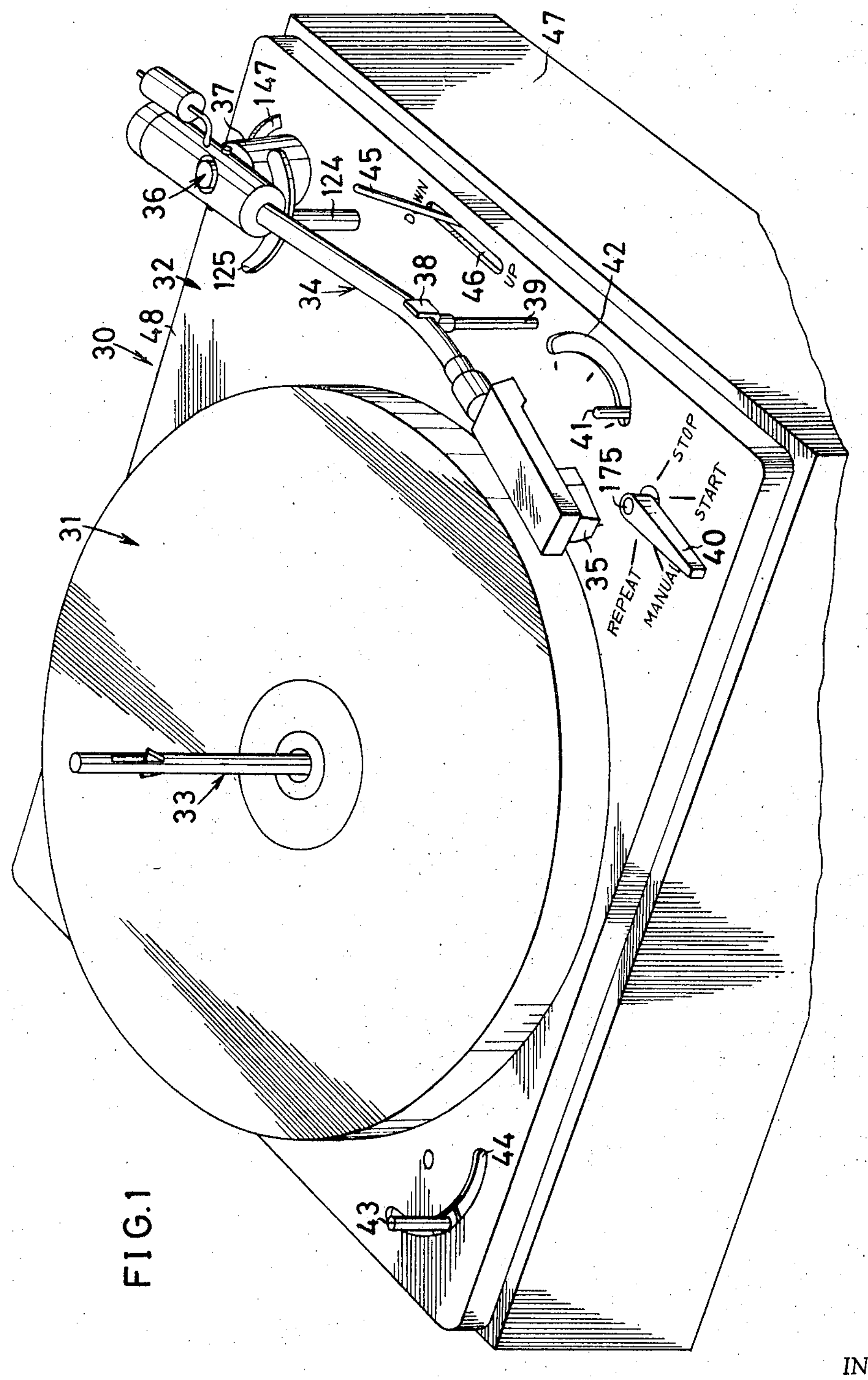
FIG. 1 is a perspective view of a record changer in accordance with an embodiment of this invention.

Referring to the drawings in detail, and initially to FIG. 1 thereof, it will be seen that a phonograph record changer in accordance with this invention is there generally identified by the reference numeral 30 and comprises a turntable 31 rotatable on a chassis 32; a spindle assembly 33 projecting upwardly from the center of turntable 31 to extend through the center holes of a stack of phonograph records and being adapted to support the stack of records at an elevated storage position disposed a substantial distance above the surface of turntable 31 and to successively feed the records from the bottom of the supported stack onto the turntable; and a tone arm assembly 34 carrying a pickup 35 and being movable mounted on chassis 32 to permit movement of pickup 35 vertically toward and away from the surface of turntable 31 and also horizontally across the surface of turntable 31 in a generally radial direction away from, and back to a rest position shown on FIG. 1 and at which pickup 35 is disposed radially outward with respect to the turntable. As shown, record changer 30 may be provided with a conventional mounting 36 for the described tone arm assembly 34 on a pedestal 37 so as to permit the movements of pickup 35, and a cradle 38 may be provided on a post 39 for supporting the tone arm assembly in its rest position. The illustrated record changer 30 is further shown on FIG. 1 to have an operating mode selecting knob 40 which may be manually moved from its illustrated neutral position to any one of four operating positions. A size selecting knob 41 projects upwardly through an arcuate slot 42 in chassis 32 and is movable to select the set down position of pickup 35 on turntable 31 for records of various sizes, and a speed control knob 43 projects upwardly through a slot 44 in chassis 32 and is movable therealong to select the speed at which turntable 31 is to be rotated. A cue control arm 45 is shown to project upwardly through a slot 46 in chassis 32 and is movable forwardly along such slot from the illustrated position for manually lifting pickup 35 from a record during the playing thereof. The chassis 32 of record changer 30 may be mounted in the usual cushioned or resilient manner on a base 47.

Figure 2:
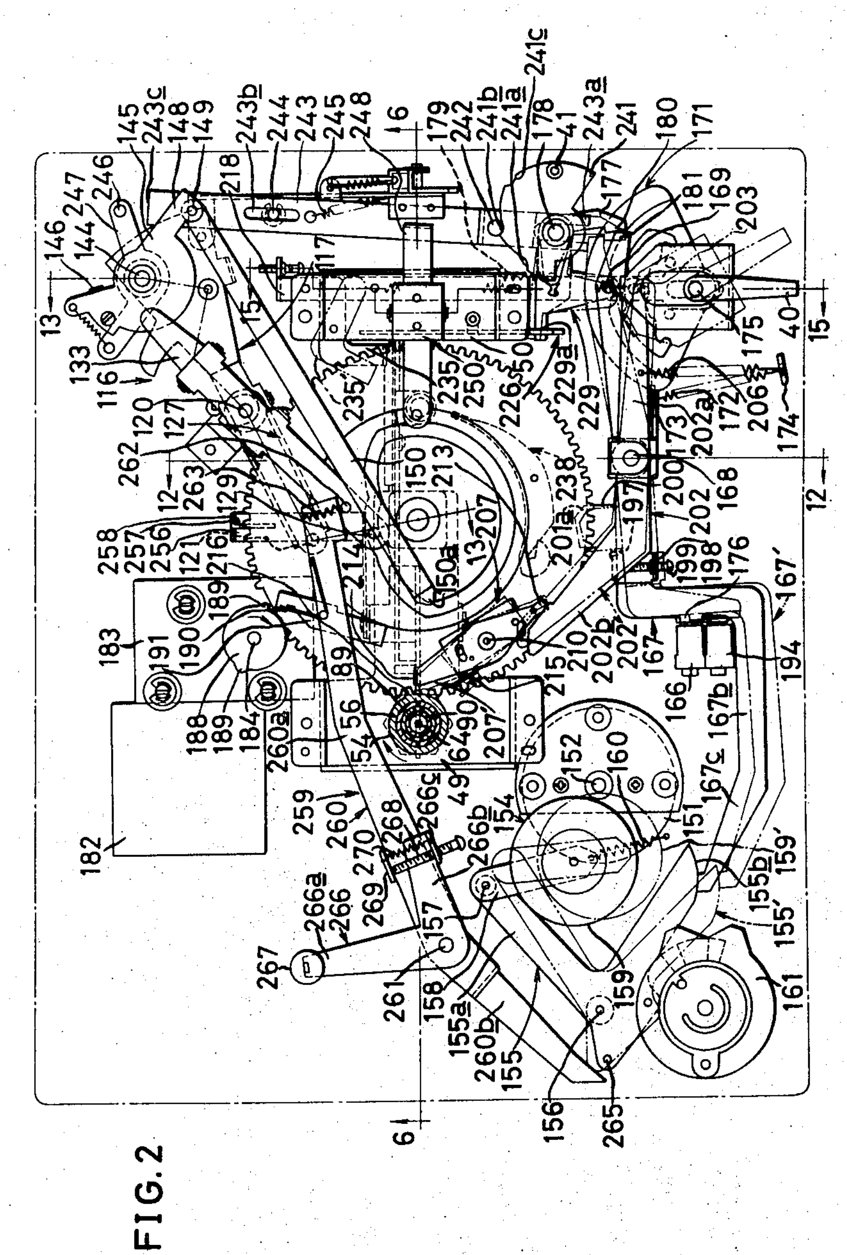
FIG. 2 is a top plan view of the record changer, but with the turntable, tone arm and chassis thereof being removed for better illustrating the underlying mechanisms of the changer which are shown in their initial positions.
Figure 3:
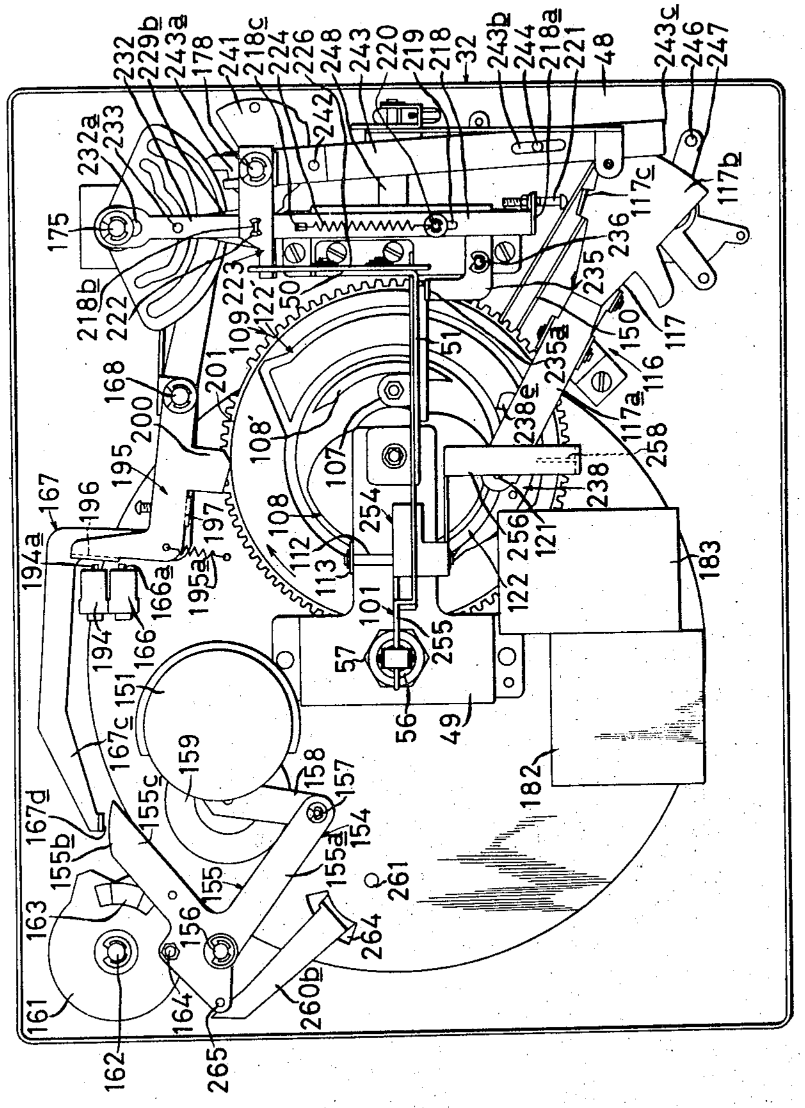
FIG. 3 is a bottom plan view of the mechanisms appearing in FIG. 2, but with such mechanisms being shown in positions thereof during operation of the changer.
Figure 4:
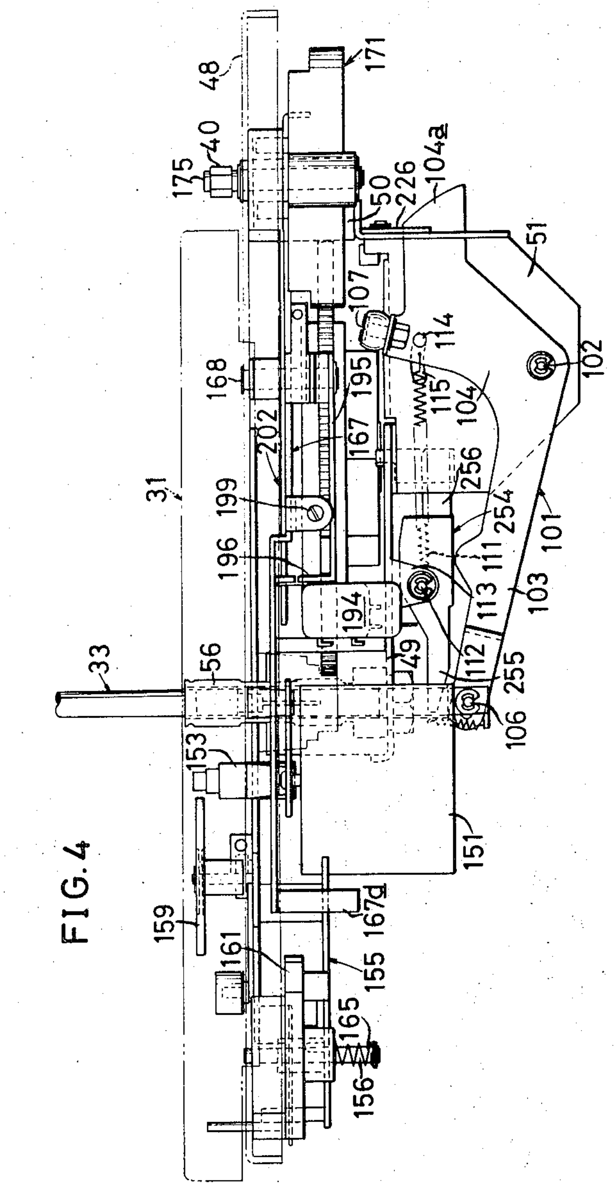
FIG. 4 is a front elevational view of the changer mechanisms appearing on FIGS. 2 and 3.
Figures 6, 6A:
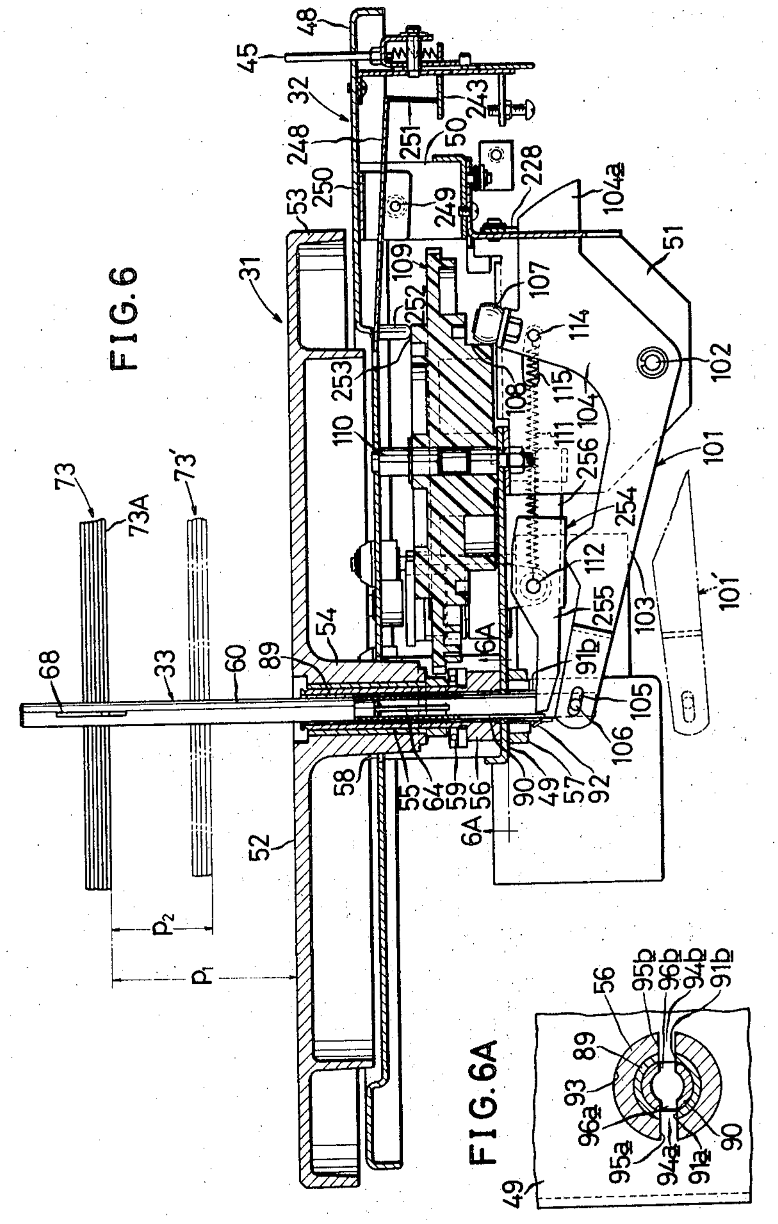
FIG. 6 is a vertical sectional view taken along line 6—6 on FIG. 2.
FIG. 6A is an enlarged, detail sectional view taken along the line 6—6 on FIG. 6.

Chassis 32 may include a generally rectangular base or plate 48 from which brackets 49 and 50 depend, and a bridging bracket 51 which extends between brackets 49 and 50 (FIGS. 2, 3 and 4). Turntable 31 is shown to include the usual circular metal disc 52 having a peripheral flange or skirt 53 and a hollow central hub 54 which depends from disc 52 and contains a bushing 55 (FIG. 6). In order to rotatably mount turntable 31 with respect to chassis 32, a sleeve bearing 56 is secured to bracket 49 as by a nut 57, and extends upwardly therefrom through an opening 58 in base plate 48. Hub 54 of turntable 31 is inserted downwardly into opening 58 with bushing 55 engaging slidably around sleeve bearing 56 and resting, at its lower end, on a thrust ball bearing 59 carried by sleeve bearing 56.

Figure 7:
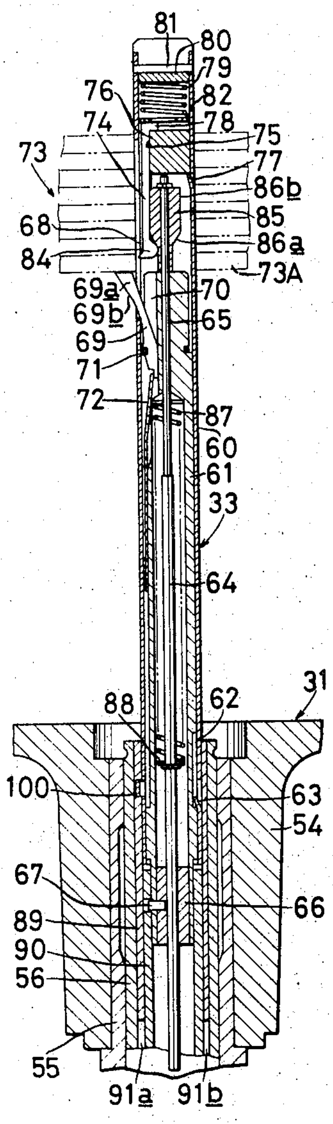
FIGS. 7, 8 and 9 are enlarged vertical sectional views of a spindle assembly included in the record changer according to this invention, and which show such spindle assembly in various conditions thereof.

Referring now to FIG. 7, it will be seen that spindle assembly 33 in accordance with this invention includes a tubular outer sleeve 60 and a tubular inner sleeve 61 disposed within outer sleeve 60 and being movable longitudinally, that is, in the vertical direction, to a limited extent relative to outer sleeve 60. Inner sleeve 61 may have a relatively short longitudinal groove 62 in the lower portion of its outer surface receiving a tab 63 struck inwardly from outer sleeve 60 for limiting the longitudinal movement of sleeve 61 relative to sleeve 60. A control rod 64 extends longitudinally through inner sleeve 61 and is longitudinally slidable relative to the latter in a reduced diamter bore 65 provided in the upper end portion of sleeve 61 and in an axially bored plug 66 which is fixed in the lower end of sleeve 61 by a pin 67 projecting radially outward from the latter. The upper end portion of outer sleeve 60 is provided with a plurality of longitudinal slots 68, for example, three slots, which are spaced apart equally about the sleeve to permit primary and secondary record support means to project radially outward through the slots 68 for alternative engagement with records on outer sleeve 60, as hereinafter described in detail.

The primary record support means of spindle assembly 33 includes, for each of the longitudinal slots 68, a primary or first record support finger 69 which is lodged in a respective longitudinal groove 70 formed in the upper end portion of inner sleeve 61. Each finger 69 is pivotally secured to sleeve 61, as by a ring 71 received in a circumferential groove formed in the outer surface of sleeve 61 and engaging in a notch formed in each finger 69, so that the finger 69 can rock or swing between a normal, expanded, record supporting position (FIG. 7) in which the upper end portion **69*a* of the finger extends radially outward through the respective slot 68, and a radially retracted or inoperative position (FIGS. 8 and 9), in which the upper end portion 69*a* of each finger 69 is radially withdrawn so that the entire finger is contained within outer sleeve 60. Each finger 69 is yieldably urged to its radially expanded record supporting position (FIG. 7) by means of a respective spring 72 which is lodged in the corresponding groove 70 and acts radially inward against the lower end of finger 69 so as to urge the latter to rock or tilt in the direction for projecting its upper end portion 69*a* radially outward through slot 68**.

It will be apparent that, with fingers 69 in their operative or radially expanded positions, a stack of phonograph records 73 placed on spindle assembly 33 with the upper end portion of outer sleeve 60 extending through the center holes of the records will have the lowest record 73A in the stack engaged and supported by the outwardly projecting upper ends **69*a* of finger 69. However, when inner sleeve 61 is displaced downwardly relative to outer sleeve 60, the downward movement of fingers 69 with sleeve 61 causes the outer edge 69*b* of each finger 69 to cam on the bottom end 68*a* of the respective slot 68, whereby to tilt the finger to its radially retracted position shown on FIGS. 8 and 9. With the fingers 69 radially retracted within outer sleeve 60, the record 73A previously supported by the upper ends of fingers 69 is released to move downwardly along the surface of sleeve 60** under the influence of gravity.

The secondary record support means of spindle assembly 33 is shown to comprise a second finger 74 for each slot 68 disposed above the corresponding first finger 69 and being received in a respective axial groove 75 formed in the outer surface of a plug 76 which is lodged in the upper end portion of outer sleeve 60 above a tab 77 struck inwardly from the outer sleeve to limit the downward movement of plug 76. Each finger 74 has an inwardly directed lug 78 extending at right angles from its upper end to engage on the top surface of plug 76. A helical compression spring 79 is interposed between a disc 80 held down by a pin 81 extending diametrically across sleeve 60 and a washer 82 which seats on lugs 78 of the fingers 74. It will be seen that the spring 79 normally urges each finger 74 to a radially retracted position (FIG. 7) in which an outwardly directed barb 83 at the lower end of the finger 74 is contained within sleeve 60.

Fingers 74 of the secondary record support means are adapted to be expanded radially outward to project the barbs 83 at their lower ends through respective slots 68 simultaneously with the radial retraction of the upper ends 69*a* of fingers 69 of the primary record support means in response to downward movement of inner sleeve 61 relative to outer sleeve 60. In order to achieve such radial expansion of fingers 74, each of the latter has an inwardly directed node 84 at its lower end engageable with a control member 85 secured on rod 64 above the upper end of inner sleeve 61. As shown, the surface of control member 85 constitutes a cam having a frusto-conical lower surface portion 86*a* that is inclined upwardly away from the axis of rod 64. Surface portion 86*a* is dimensioned so that, when nodes 84 of fingers 74 are engaged with the small diameter end of surface portion 86*a*, as on FIG. 7, spring 79 can urge fingers 74 to their normal, radially retracted positions, whereas downward movement of control member 85 in respect to outer sleeve 60, causes surface portion 86*a* to act outwardly on nodes 84 and thereby rock fingers 74 in the direction for radially expanding the lower ends thereof. Control member 85 is further shown to have a cylindrical upper surface portion 86*b* extending parallel to the axis of rod 64 from the upper end of frusto-conical surface portion 86*a* and which is diametrically dimensioned so that, when nodes 84 of fingers 74 are engaged by cylindrical surface portion 86*b*, the lower ends of fingers 74 are projected radially outward through slots 68 to the full extent shown on FIG. 9.

Figure 8:
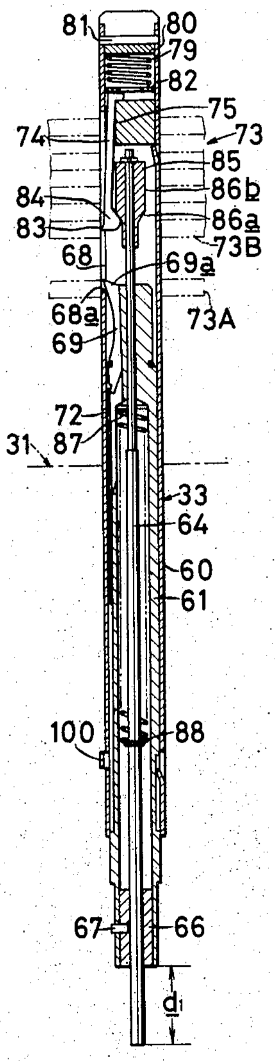

Control member 85 is yieldably urged to move downwardly with inner sleeve 61 relative to outer sleeve 60 by means of a helical compression spring 87 extending around rod 64 and bearing, at its opposite ends, against the upper end portion of sleeve 61 and an abutment 88 fixed on rod 64. Thus, control member 85 is resiliently held in contact with the upper end of sleeve 61, as on FIGS. 7 and 9, but is capable of being vertically separated from sleeve 61, as on FIG. 8, for example, when control member 85 is not free to move downwardly with inner sleeve 61 to the full extent of the downward movement of sleeve 61 relative to outer sleeve 60. More particularly, it will be noted that the engagement of nodes 84 of fingers 74 by upper surface portion 86*b* of control member 85, as on FIG. 9, radially expands the lower ends of fingers 74 to a full extent greater than the size of the center holes of the records in stack 73. Thus, when inner sleeve 61 is moved downwardly relative to outer sleeve 60 for radially retracting fingers 69 of the primary record support means and thereby releasing the lowest record 73A of the stack previously supported by fingers 69, control member 85 will tend to move downwardly with inner sleeve 61, by reason of spring 87, and will tend to displace fingers 74 radially outward in the respective slots 68. However, if there is at least one record on spindle 33 above the lowest record 73A, for example, the next lowest record 73B on FIG. 8, the full radial expansion of the lower ends of fingers 74 that would result from the engagement of nodes 84 with cylindrical surface portion 86*b* is blocked by the engagement of barbs 83 with the surface of the central hole of record 73B (FIG. 8). Accordingly, downward movement of control member 85 with inner sleeve 61 relative to outer sleeve 60 is limited with consequent compression of spring 87 and the force of that spring causes barbs 83 to engage strongly with record 73B for temporarily supporting that record and also any other records in the stack 73 above record 73B. Thus, full radial expansion of fingers 74 is possible only when the record being released by the primary record support means is the last of the records on spindle assembly 33.

Figure 9:
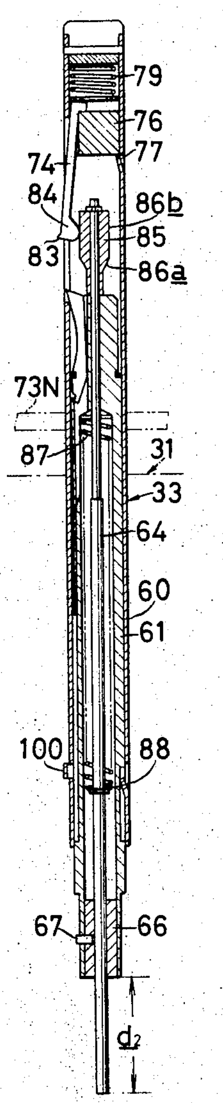

Reference to FIGS. 8 and 9 will show that, when inner sleeve 61 is moved downwardly relative to outer sleeve 60 for releasing a record from the primary record support means, the lower end of rod 64 will project a relatively small distance $d_1$ (FIG. 8) below the bottom end of inner sleeve 61 if there is any other record on the spindle above the record being released, whereas the lower end of rod 64 will project a relatively large distance $d_2$ (FIG. 9) below the bottom end of sleeve 61 if, at the time of the release of a record by the primary record support means, there is no other record on the spindle assembly above the record being released. As hereinafter described in detail, the distance that the rod 64 projects downwardly beyond the lower end of inner sleeve 61 at the time of release of a record by the primary record support means is detected as an indication of whether or not there are any further records on the spindle assembly.

The lower end portions of outer and inner sleeves 60 and 61 of spindle assembly 33 are removably mounted in outer and inner mounting sleeves 89 and 90, respectively (FIGS. 6, 7, 10 and 11). Outer mounting sleeve 89 is vertically slidable within bearing 56 and has diametrically opposed longitudinal slots 91*a* and 91*b*. The lower end of slot 91*b* is closed at its lower end where a tab 92 is struck outwardly from sleeve 89 for engagement with the lower end of bearing 56 to limit the upward movement of sleeve 89, as shown on FIG. 6. Further, as shown particularly on FIG. 6A, the opening 93 formed in bracket 49 to receive bearing 56 has diametrically opposed ears 94*a* and 94*b* directed inwardly from its periphery to extend through slots 95*a* and 95*b* in the lower end portion of bearing 56, and to be slidably received in slots 91*a* and 91*b*, respectively. Thus, ears 94*a* and 94*b* prevent rotation of sleeve 89 by engagement of ears 94*a* and 94*b* with the upper ends 91′ (FIG. 10) of the respective slots 91*a* and 91*b*. The inner mounting sleeve 90 which is slidable vertically in sleeve 89 is also formed with a pair of diametrically opposed longitudinal slots 96*a* and 96*b* (FIGS. 6A and 11) which open axially at the lower end of sleeve 90 and which register with slots 91*a* and 91*b* of outer sleeve 89. Further, sleeve 90 has a bore 97 extending diametrically therethrough at right angles to the plane of the slots 96*a* and 96*b*.

In order to releasably lock sleeves 60 and 61 of spindle assembly 33 in mounting sleeves 89 and 90, respectively, the upper end portions of sleeves 89 and 90 are formed with bayonet slots 98 and 99 (FIGS. 10 and 11) which are adapted to receive a lug 100 (FIGS. 7, 8 and 9) struck outwardly from the lower end portion of sleeve 60 and the previously mentioned pin 67 which projects radially outward from the lower end portion of sleeve 61. In installing spindle 33, the latter is inserted downwardly into the upper end portions of sleeves 89 and 90 so as to cause the entry of lug or projection 100 and pin 67 into the longitudinally extending portions of the respective bayonet slots 98 and 99, and then the spindle is turned to lock lug 100 and pin 67 in the circumferentially extending portions of the respective slots 98 and 99.

For effecting operation of spindle assembly 33, record changer 30 is shown to include a spindle operating bell crank 101 (FIGS. 4 and 6) which is pivoted on a pin 102 carried by bridging bracket 51, and which includes generally right angularly related arms 103 and 104 movable in a vertical plane in response to rocking of the bell crank. Arm 103 extends laterally from pivot pin 102 and its free end portion extends through slots 96*a* and 96*b* of mounting sleeve 90 and is formed with a longitudinal slot 105 which slidably receives a pin 106 provided in bore 97 of sleeve 90 for connecting the latter to arm 103. The other arm 104 of bell crank 101 extends upwardly from pivot pin 102 and has a cam follower roller 107 mounted at its upper end for engagement with a radial cam surface 108 (FIGS. 3, 6 and 20) defined at the underside of a cam member 109 provided for controlling the operation of spindle assembly 33 and of tone arm assembly 34 during each operating cycle of record changer. As shown particularly on FIG. 6, cam member 109 is rotatably mounted on a vertical axle 110 having its upper end secured to chassis plate 48 and its lower end secured to brackets 49 and 51. Cam follower roller 107 is held radially inward against cam surface 108 by a spring 111 connected, at its ends, to a pin 112 extending between ears 113 depending from bracket 49 and a pin 114 extending from arm 104 and engaging slidably in an arcuate slot 115 in adjacent bracket 51 to limit the rocking movements of bell crank 101. Thus, in response to rotation of cam member 109 and by reason of the configuration of cam surface 108, as hereinafter described in detail, bell crank 101 is displaced between the position shown in full lines on FIG. 6, which corresponds to the normal condition of spindle assembly 33 for holding the stack of records 73 at an elevated storage position which is a substantial distance $p_1$ above the surface of turntable 31 so that the level of the lowest record 73A in the record stack will be above the path of movement of tone arm assembly 34, and a rocked position of the bell crank indicated in broken lines at 101' on FIGS. 6 and which corresponds to the condition of spindle assembly 33 for releasing the lowest record in the stack for movement onto the turntable.

Figure 5:
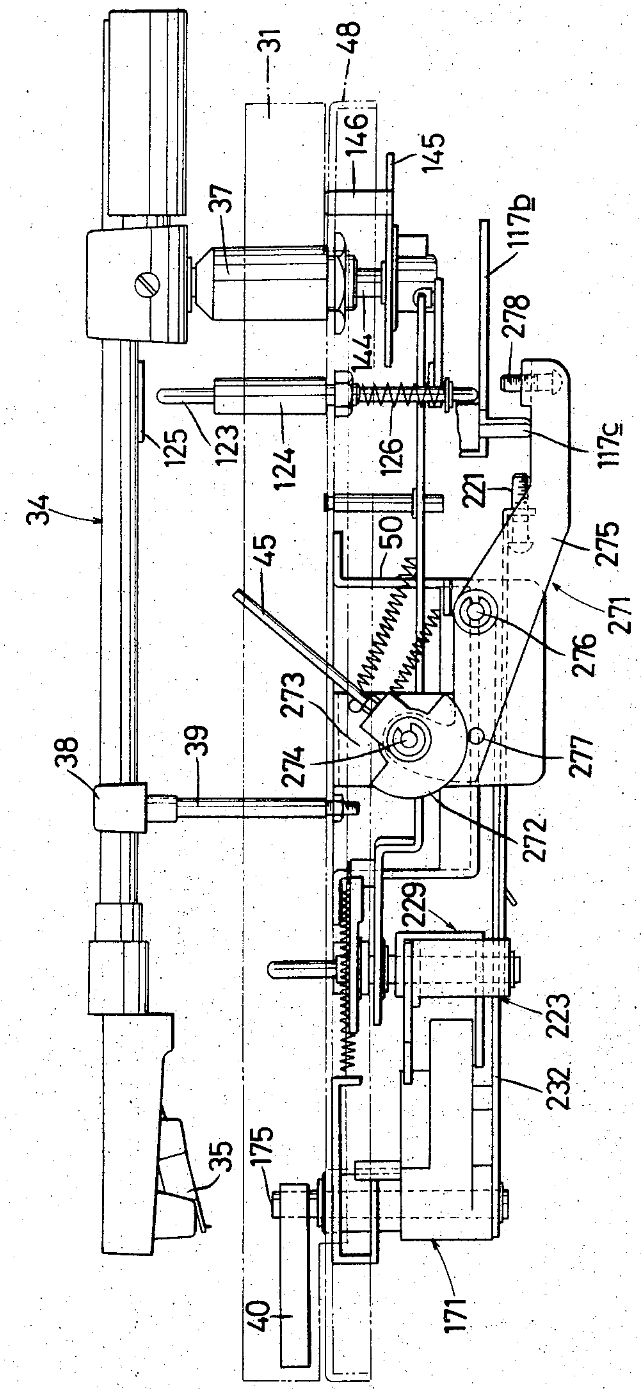
FIG. 5 is a side elevational view of the changer mechanism appearing on FIGS. 2 and 3, and with the tone arm being shown in a rest position.
Figure 13:
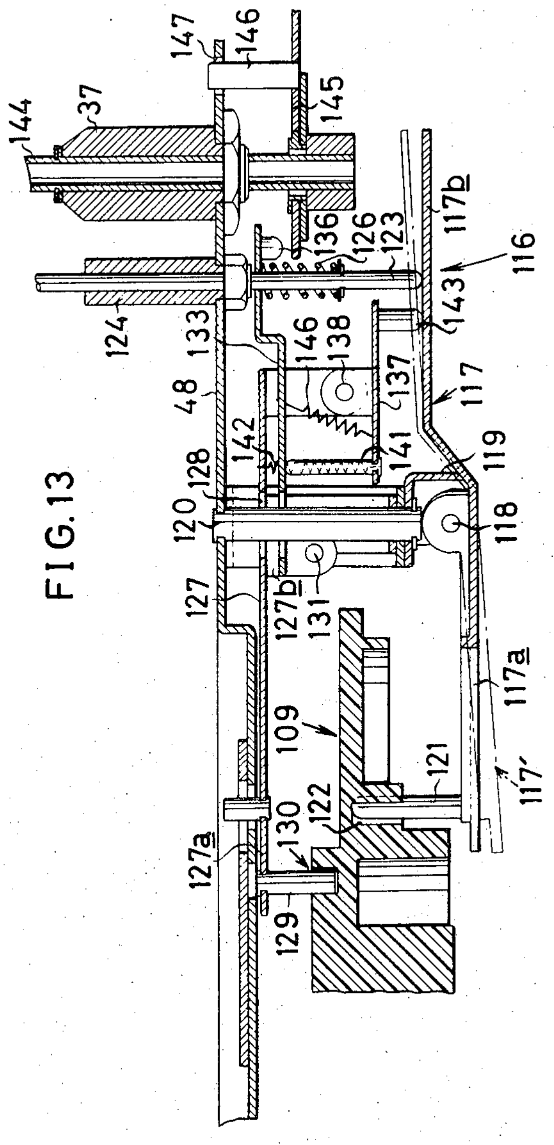
FIG. 13 is a fragmentary sectional view taken along the line 13—13 on FIG. 2.

Referring now to FIGS. 2, 3, 13 and 14, it will be seen that record changer 30 further comprises a tone arm actuating assembly 116 for controlling the movement of tone arm assembly 34 during each record changing cycle of the record changer. The tone arm actuating assembly 116 is shown to include a lift lever 117 which is rockably mounted, intermediate its ends, on a horizontal pivot pin 118 carried by a support 119 which is turnable on the lower end of a vertical pivot pin 120 depending from chassis plate 48 (FIG. 13). One arm 117*a* of lift lever 117 carries a cam follower pin 121 which projects upwardly from its free end and is engageable in a cam groove 122 (FIGS. 3, 13 and 20) also defined in the underside of cam member 109. The opposite arm 117*b* of lift lever 117 is generally sector-shaped (FIGS. 3 and 14) and extends under the lower end of a lift rod 123 which is vertically slidable in a vertical bushing 124 secured on chassis plate 48 (FIGS. 1, 5 and 13). The upper end of lift rod 123 is disposed under, and hence engageable with an arcuate lift plate 125 (FIGS. 1 and 5) secured to the underside of tone arm assembly 34 so as to be engageable by rod 123 at all positions of the tone arm asembly during the horizontal swinging of the latter. A spring 126 is provided around the lower portion of rod 123 to urge the latter downwardly so that the lower end of lift rod 123 bears downwardly on arm 117*b* to urge lift lever 117 to rock in the clockwise direction, as viewed on FIG. 13, and thereby urge cam follower pin 121 upwardly in cam groove 122. Cam groove 122 is vertically shaped, as hereinafter described in detail, so that, in response to rotation of cam member 109, lift lever 117 is rocked between the position shown in full lnes on FIG. 13, which corresponds to a lowered position of tone arm assembly 34 at which the stylus of pickup 35 can engage and track the grooves of a record on turntable 31, and the position indicated in broken lines at 117' on FIG. 13, which corresponds to a raised position of tone arm assembly 34 at which stylus 34 is elevated with respect to a record or records on the turntable.

Figure 14:
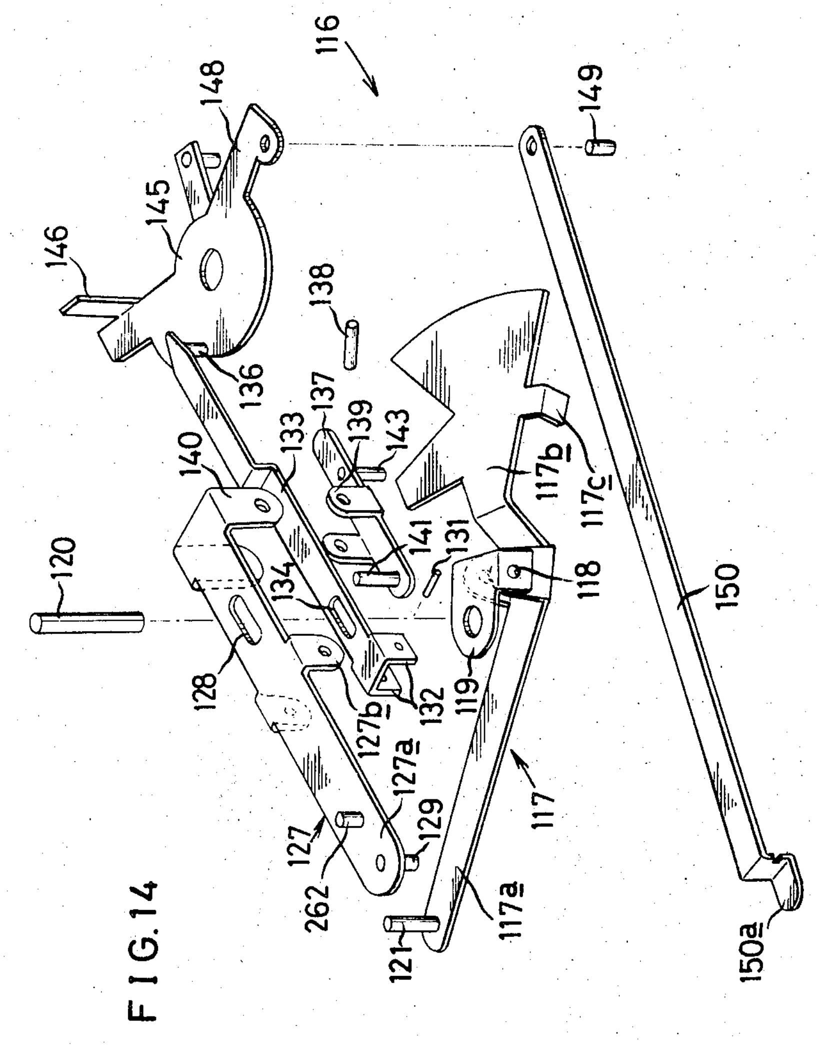
FIG. 14 is an exploded perspective view showing the components of a tone arm control assembly included in the record changer according to this invention.
Figure 15:
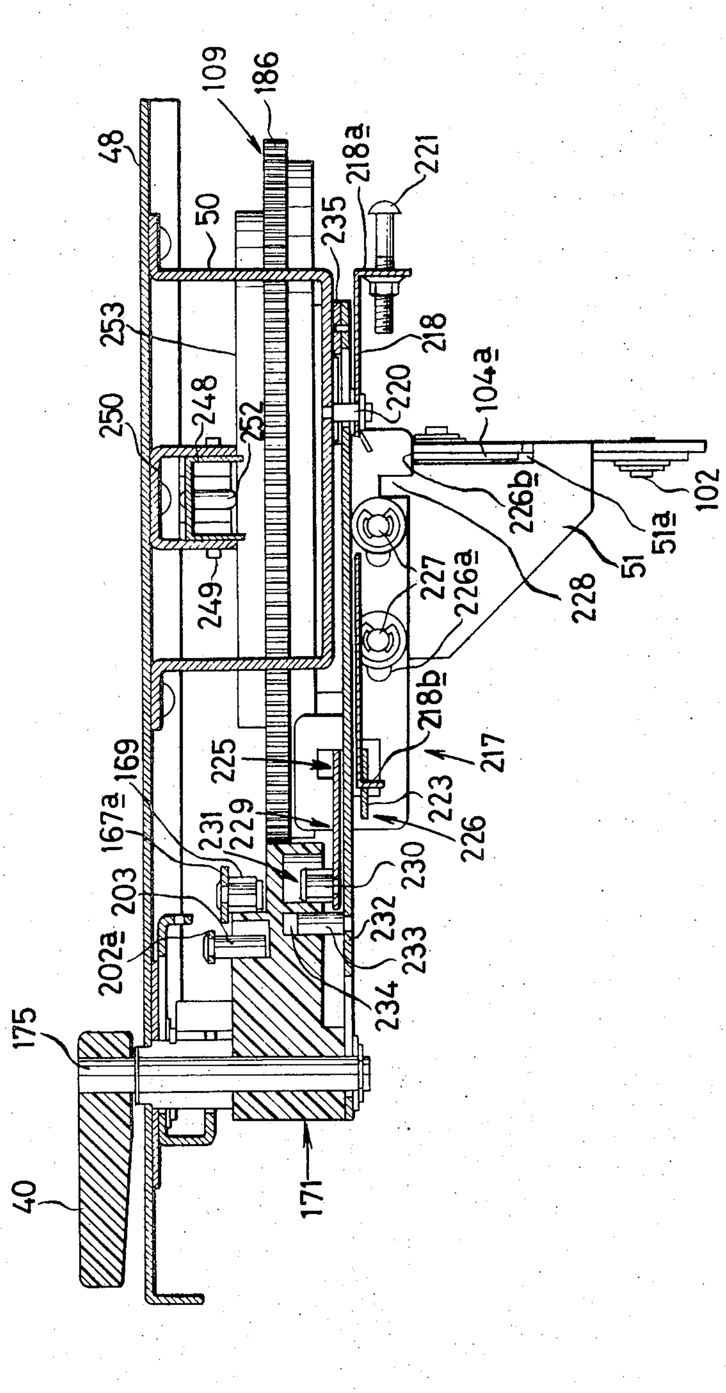
FIG. 15 is a fragmentary sectional view taken along the line 15—15 on FIG. 3, but showing the changer mechanism in an operative condition.
Figure 19:
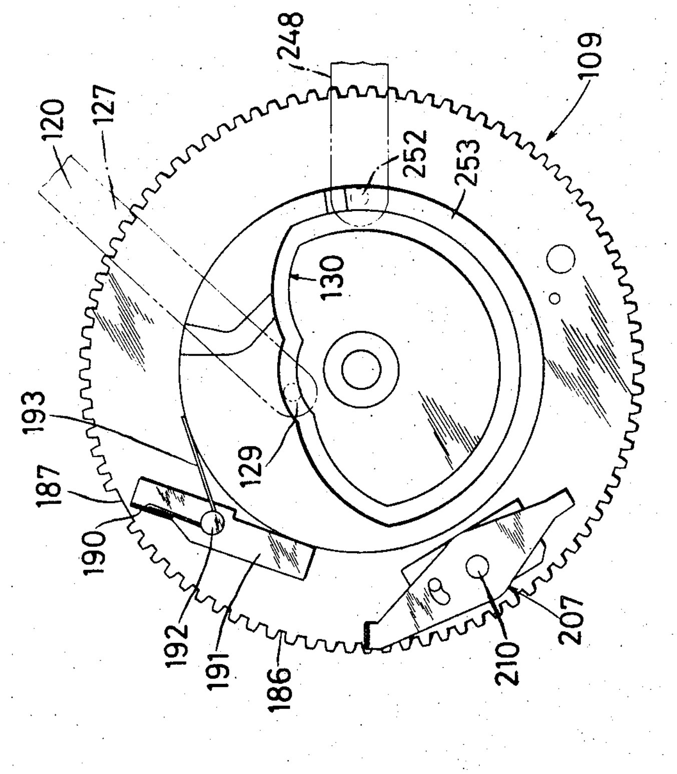

In order to control the horizontal swinging movements of tone arm assembly 34, actuating assembly 116 is further shown to include a lever 127 which is disposed immediately under chassis plate 48 and which has an elongated slot 128 receiving pin 120 so as to be horizontally swingable about the latter. One end portion 127*a* of lever 127 carries a depending cam follower pin 129 which is engageable from above in a cam groove 130 defined in the upper side of cam member 109 (FIGS. 13 and 19). Intermediate its ends, lever 127 has ears 127*b* depending therefrom and carrying a horizontal pin 131 on which there are pivoted ears 132 provided at one end of a lever extension 133 which also has a slot 134 through which pin 120 loosely extends (FIGS. 13 and 14). Thus, lever extension 133 is turnable with lever 127 about an axis defined by pin 120, and lever extension 133 is tiltable relative to lever 127 about the horizontal axis defined by pin 131 for raising and lowering the free end of lever extension 133 which carries a depending frictional member 136 formed, for example, of rubber. A control lever 137 is interposed between lever extension 133 and lift lever 117 and is rockably suspended from lever 127, for example, by a pin 138 which pivotally connects ears 139 extending upwardly from control lever 137 intermediate the ends of the latter and ears 140 formed on lever 127 at the end of the latter remote from end 127*a* (FIGS. 13 and 14). Control lever 137 has an upstanding pin 141 at one end thereof engageable with the underside of lever extension 133, and that one end of control lever 137 is connected with lever 127 by a tension spring 142 for holding pin 141 in contact with lever extension 133. The opposite end of control lever 137 carries a depending pin 143 which is engageable from above with the sector-shaped arm 117*b* of lever 117.

The tone arm assembly 34 is suitably mounted at the upper end of a shaft 144 (FIGS. 2, 5 and 13) so as to swing horizontally in response to turning of shaft 144 in the pedestal 37. The lower end of shaft 144 is disposed below chassis plate 48 and has a control plate 145 fixed thereon so as to be engageable, from above, by frictional member 136 on lever extension 133. When lever 117 is in the position shown in full lines on FIG. 13, control lever 137 is urged in the clockwise direction by spring 142 so that pin 141 acts upwardly on lever extension 133 and thereby raises frictional member 136 from control plate 145, as shown, whereby horizontal swinging of lever 127 and extension 133 is not transmitted to control plate 145 to effect swinging of the tone arm assembly. However, when lever 117 is tilted to the position indicated in broken lines at 117' on FIG. 13, which movement causes lift rod 123 to elevate the tone arm assembly, control lever 137 is rocked in the counterclockwise direction to lower pin 141 and to permit a spring 146, which is connected between lever 137 and lever extension 133, to depress lever extension 133 and urge member 136 into frictional contact with the upper surface of control plate 145. When such frictional contact is established between member 136 and plate 145, the swinging movements of lever 127 and extension 133 resulting from the rotation of cam member 109 and the shape of cam groove 130, as hereinafter described in detail, are transmitted to control plate 145 to produce corresponding horizontal swinging movements of tone arm assembly 34.

The horizontal swinging movements of tone arm assembly 34 are limited by a tab 146 which extends upwardly from control plate 145 and is engageable in an arcuate slot 147 formed in chassis plate 48 (FIGS. 1 and 13). Further, an arm 148 extends radially outward from control plate 145 and, at its free end, is pivotally connected by a pin 149 to an automatic change cycle initiating rod 150 which extends substantially diametrically over cam member 109 and is guided for longitudinal movement in a suitable slot (not shown) formed in chassis plate 48. It will be apparent that the position of the free end 150*a* of rod 150 in the longitudinal direction of the latter depends upon the position of tone arm assembly 34 in the horizontal direction.

The drive for effecting rotation of turntable 31 is shown to comprise a motor 151 (FIGS. 2, 3 and 4) suitably mounted below chassis plate 48 and having its shaft 152 extending upwardly through an opening in the chassis plate and carrying a stepped drive roller 153 (FIG. 4) above the chassis plate. An idler assembly 154 is provided for transmitting the rotation from drive roller 153 to turntable 31, for example, to the skirt or rim 53 of the turntable, and is shown to include an idler bell crank 155 which is horizontally swingable and also vertically movable on a pivot pin 156 depending from chassis plate 48. One arm 155*a* of idler bell crank 155 carries a pin 157 at its free end to which there is pivotally connected a link 158 carrying a shaft extending upwardly through a suitable opening in chassis 48 and carrying a freely rotatable idler wheel 159. A spring 160 (FIG. 2) is connected between the free end of link 158 and a suitable anchor on chassis plate 48 for urging idler wheel 159 from its inoperative position shown in full lines on FIG. 2 to its operative position indicated in broken lines at 159' where the idler wheel engages both drive roller 153 and the skirt 53 of the turntable.

In order to select the speed of rotation of turntable 31, idler wheel 159 may be shifted vertically so as to be engageable with a selected one of the different diameter portions of stepped drive roller 153. Such vertical displacement of idler wheel 159 may be effected by a conventional mechanism, for example, by a speed selecting cam member 161 turntable on a shaft 162 depending from chassis plate 48 and having the speed selecting knob 43 projecting upwardly from cam member 161. The underside of cam member 161 is formed with a stepped cam surface 163 (FIG. 3) engageable by a cam follower pin 164 under the urging of a spring 165 extending around pin 156 (FIG. 4) and acting upwardly on idler bell crank 155.

The turnable drive motor 151 is energizable by an electric circuit (not shown) having interposed therein a micro switch 166 mounted under chassis plate 48, and which is of the type that closes its contacts to energize motor 151 when the exterior 166*a* of switch 166 is free to move to its normal extended position shown on FIG. 3. In order to control switch 166, there is provided a first switch control lever 167 which is pivotally mounted, intermediate its ends, on a pivot pin 168 depending from chassis plate 48 (FIGS. 2, 3, 12 and 16). One arm 167*a* of lever 167 carries a depending cam follower pin 169 (FIGS. 2, 16 and 17) which is urged into engagement with a cam surface 170 formed on the upper side of an operating mode selecting cam 171 by means of a spring 172 (FIG. 2) extending between an anchoring tab 173 formed on lever 167 and an anchoring tab 174 struck downwardly from chassis plate 48 (FIG. 2). Cam 171 is secured on the lower end portion of a shaft 175 which is journaled in chassis plate 48 and has the operating mode selecting knob 40 secured on its upper end above the chassis plate.

Figure 16:
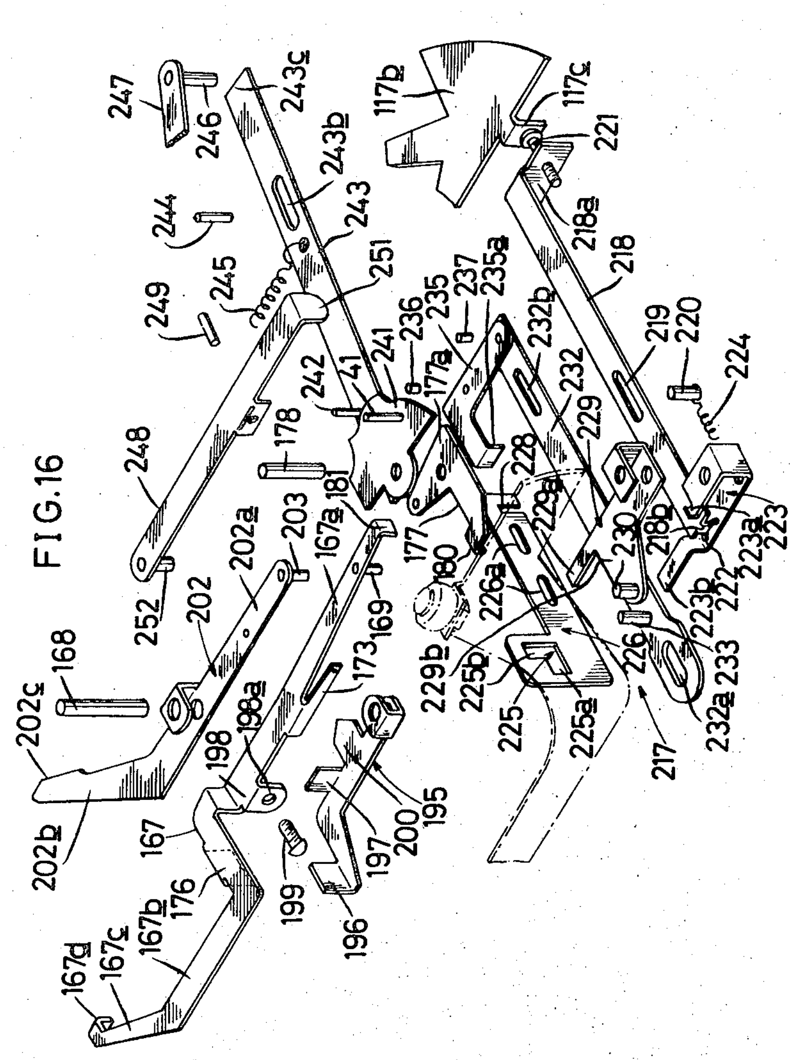
FIG. 16 is an exploded perspective view showing the components of a stop assembly, a repeat assembly and a size selecting assembly which are included in the record changer according to this invention.
Figure 11:
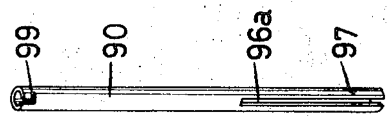
FIGS. 10 and 11 are perspective views of respective mounting sleeves which receive and support the spindle assembly.
Figure 10:
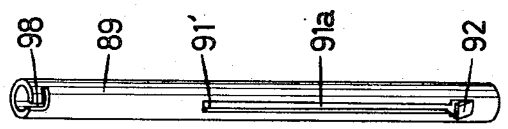
Figure 12:
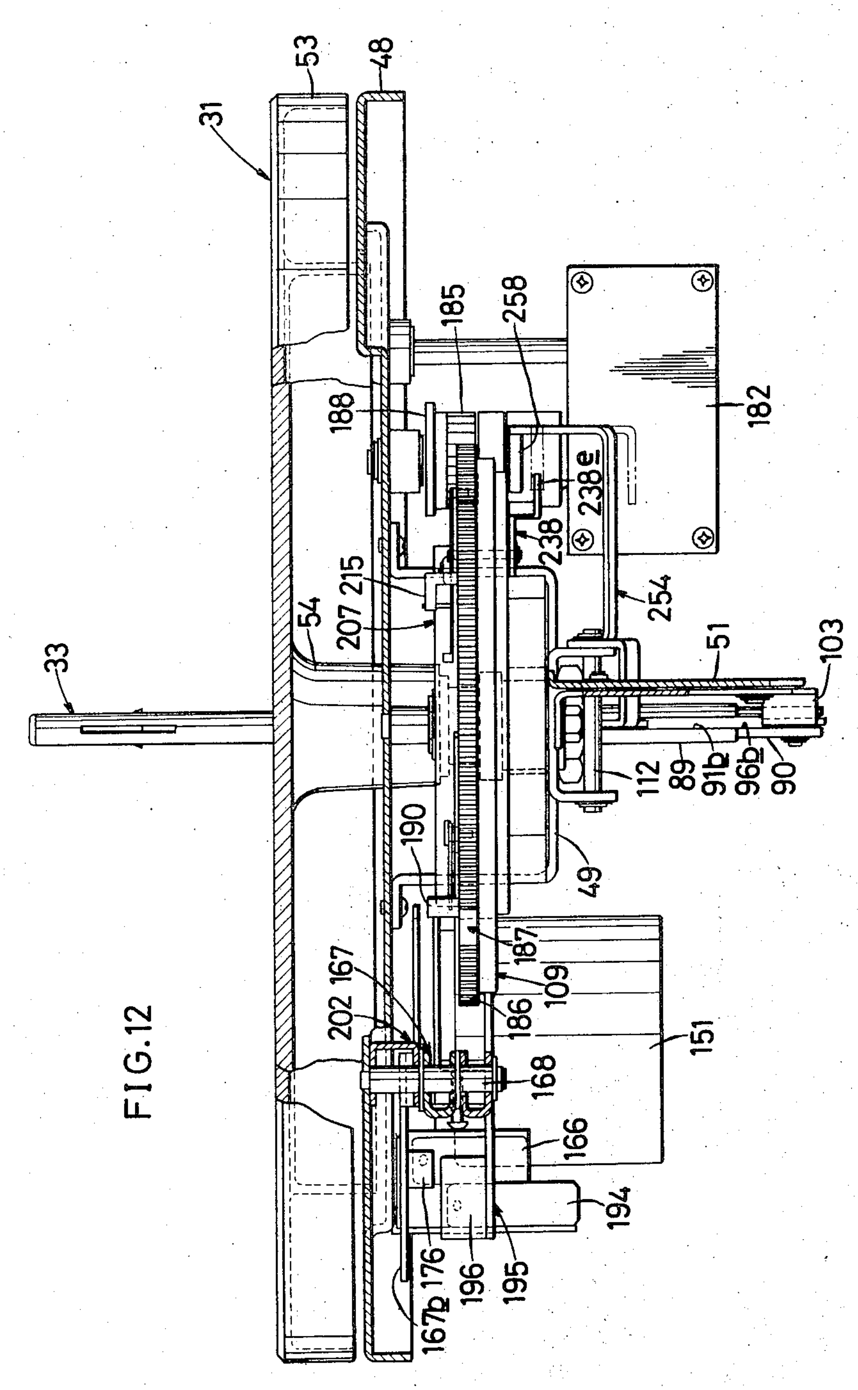
FIG. 12 is a vertical sectional view taken along the line 12—12 on FIG. 2, but showing the changer mechanisms in an operative condition.
Figure 17:
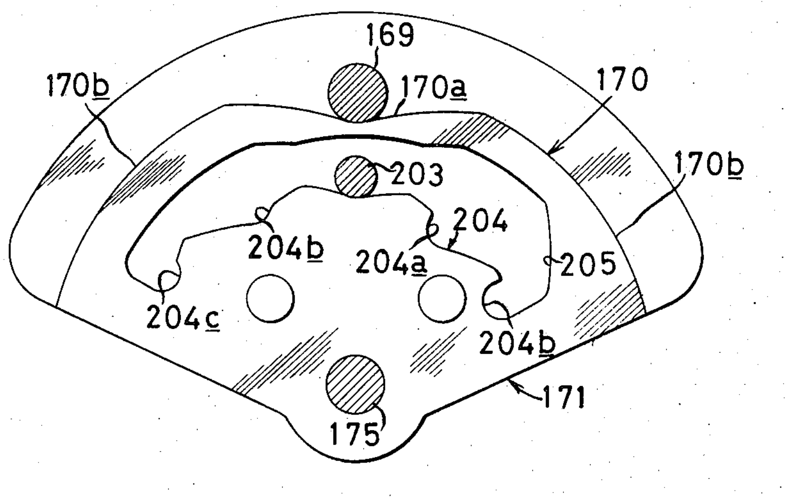
FIGS. 17 and 18 are respectively a top plan view and a bottom plan view of an operating mode selecting cam member included in the record changer.

As shown particularly on FIG. 17, cam surface 170 has a central portion 170*a* which is depressed radially, that is, at a relatively small distance from the axis of shaft 175, and lateral portions 170*b* at the opposite sides of central portion 170*a* which are disposed a uniformly, relatively large radial distance from the axis of shaft 175. When knob 40 is in its neutral or central position shown on FIGS. 1 and 2, cam follower pin 169 engages central portion 170*a* of cam surface 170 and thereby occupies a relatively forward position. However, when knob 40, and hence cam member 171, is pivoted from its neutral position to any one of the previously mentioned operating positions of knob 40, cam follower pin 169 rides onto one or the other of the cam surface portions 170*b*, and hence is displaced rearwardly to pivot switch control lever 167 in the counterclockwise direction, as viewed on FIG. 2, that is, from the position shown in full lines to the position indicated in broken lines at 167'. As shown particularly on FIGS. 2, 12 and 16, the other arm 167*b* of lever 167 has an abutment 176 bent downwardly therefrom to confront the actuator 166*a* of switch 166. When lever 167 is in a position shown in full lines on FIG. 2, that is, when knob 40 and cam member 171 are in the neutral or centered position, abutment 176 engages and depresses switch actuator 166*a* so that the contacts of switch 166 are opened to deenergize turntable drive motor 151. However when cam member 171 is moved angularly to any one of the operating mode selecting positions, that is, when lever 167 is moved to the position indicated in broken lines at 167' on FIG. 2 and shown in full lines on FIG. 3, abutment 176 is moved away from switch actuator 166*a* to permit the return of the latter to its normal extended position, whereby the contacts of switch 166 are closed to effect energization of motor 151. In order to hold switch control lever 167 in the described position for permitting closing of the contacts of switch 166 even after cam member 171 has returned to its neutral position, a latch 177 is pivoted on a shaft 178 depending from chassis plate 48 (FIGS. 2 and 16) and is urged by a spring 179 in the clockwise direction, as viewed on FIG. 2, to cause a latching nose 180 formed on lever 177 to bear against the side of an abutment 181 formed on the end of lever arm 167*a*. Thus, when lever 167 is moved to the position permitting the closing of the contacts of switch 166, nose 180 of latching lever 177 engages in front of abutment 181 for maintaining lever 167 in that position.

Arm 167*b* of lever 167 is further shown to have an extension 167*c* (FIGS. 2, 3 and 16) which terminates in a depending abutment 167*d* disposed adjacent an arcuate surface 155*b* at the end of the arm 155*c* of idler bell crank 155. When lever 167 is in the position shown in full lines on FIG. 2, the abutment 167*d* of the lever rides on end surface 155*b* and the force of spring 172 is sufficient to overcome the force of spring 160 so that idler bell crank 155 is rocked to the position shown in full lines on FIG. 2 at which idler wheel 159 is disengaged from both drive roller 153 and skirt or rim 53 of turntable 31. However, when lever 167 is rocked or pivoted to the position indicated in broken lines at 167' on FIG. 2 and in full lines on FIG. 3, abutment 167*d* is moved away from end surface 155*b* to permit idler bell crank 155 to be moved to its operative position indicated in broken lines at 155' on FIG. 2, whereby spring 160 is then effective to hold idler wheel 159 in frictional engagement with drive roller 153 and with turntable skirt 53.

The record changer 30 according to this invention further comprises a drive for effecting a single complete revolution of cycle controlling cam member 109 during each record changing cycle of the changer. Such drive is shown to comprise an electric motor 182 and change speed gearing 183 suitably supported below chassis plate 48 with change speed gearing 183 having its output shaft 184 disposed adjacent the periphery of cam member 109 and carrying a pinion 185 for meshing engagement with gear teeth 186 formed on the periphery of cam member 109. As shown particularly on FIGS. 19 and 21, gear teeth 186 extend substantially around the entire periphery of cam member 109 with the exception of a space or gap 187 which, at the start of each record changing operation of changer 30, is positioned adjacent pinion 185 so that the latter is disengaged from teeth 186. A disc 188 is further secured on shaft 184 above gear or pinion 185 and is formed with diametrically opposed projections or nodes 189 (FIGS. 2 and 21) which are adapted to reach over the top surface of the periphery of cam member 109 for engagement with an abutment 190 extending upwardly from an end of a member 191 which is pivoted on a pin 192 carried by cam member 109 and urged by a hair pin spring 193 (FIG. 19) to project abutment 190 into the path of projections 189.

The energization of motor 182 for driving cam member 109 is effected by an electric circuit (not shown) having interposed therein a switch 194 (FIGS. 2, 3 and 12) which is suitably mounted below chassis plate 48 adjacent switch 166. Switch 194 is similar to switch 166, that is, it is of a type whose contacts are closed when the switch actuator 194*a* (FIG. 3) is free to move to its normal extended position, as shown, whereas the contacts of switch 194 are opened when actuator 194*a* is depressed. A second switch control lever 195 (FIGS. 3, 12 and 16) is pivotally mounted, at one end, on pin 168 below switch control lever 167 and is formed with an upstanding tab or abutment 196 at its other end which is disposed in confronting relation to actuator 194*a* of switch 194. Switch control lever 195 is further provided, intermediate its ends, with an upstanding abutment 197 disposed in confronting relation to a depending ear 198 formed on switch control lever 167. Ear 198 has a tapped hole 198*a* (FIG. 16) which receives a screw 199 adapted to be engaged by abutment 197. Switch control arm 195 is further shown to have a projection 200 extending therefrom to ride on a peripheral surface 201 formed on cam member 109 below gear teeth 186 and having a notch 201*a* (FIGS. 2 and 20) in which projection 200 engages when cam member 109 is in its initial position.

In order to initiate the revolution of cam member 109 from its initial position where the gap 187 in teeth 186 is adjacent pinion 185, record changer 30 is further provided with a start lever 202 (FIGS. 2, 4, 12 and 16) which is pivotally mounted, intermediate its ends, on the pivot pin 168 above switch control lever 167. One arm 202*a* of start lever 202 extends laterally outward over cam member 171 and carries a depending cam follower pin 203 which is urged into engagement with a cam surface 204 defined along the forward side of a groove 205 formed in the upper surface of cam member 171. A spring 206 (FIG. 2) is connected between arm 202*a* and another tab 174 to urge start lever 202 in the clockwise direction, as viewed on FIG. 2, that is, to hold cam follower pin 203 against cam surface 204. The other arm 202*b* of start lever 202 extends laterally inward from pivot pin 168 and is angled, as shown, to provide a clutch actuating surface 202*c* which is engageable with a starting clutch assembly 207, for example, when knob 40 and cam member 171 are moved to the position indicated at "START" on FIG. 1, in which position cam follower pin 203 engages in a recessed portion 204*a* (FIG. 17) of cam surface 204 to permit spring 206 to pivot start lever 202 from the position shown in full lines on FIG. 2 to the position indicated in broken lines at 202'.

Figures 21, 22, 23:
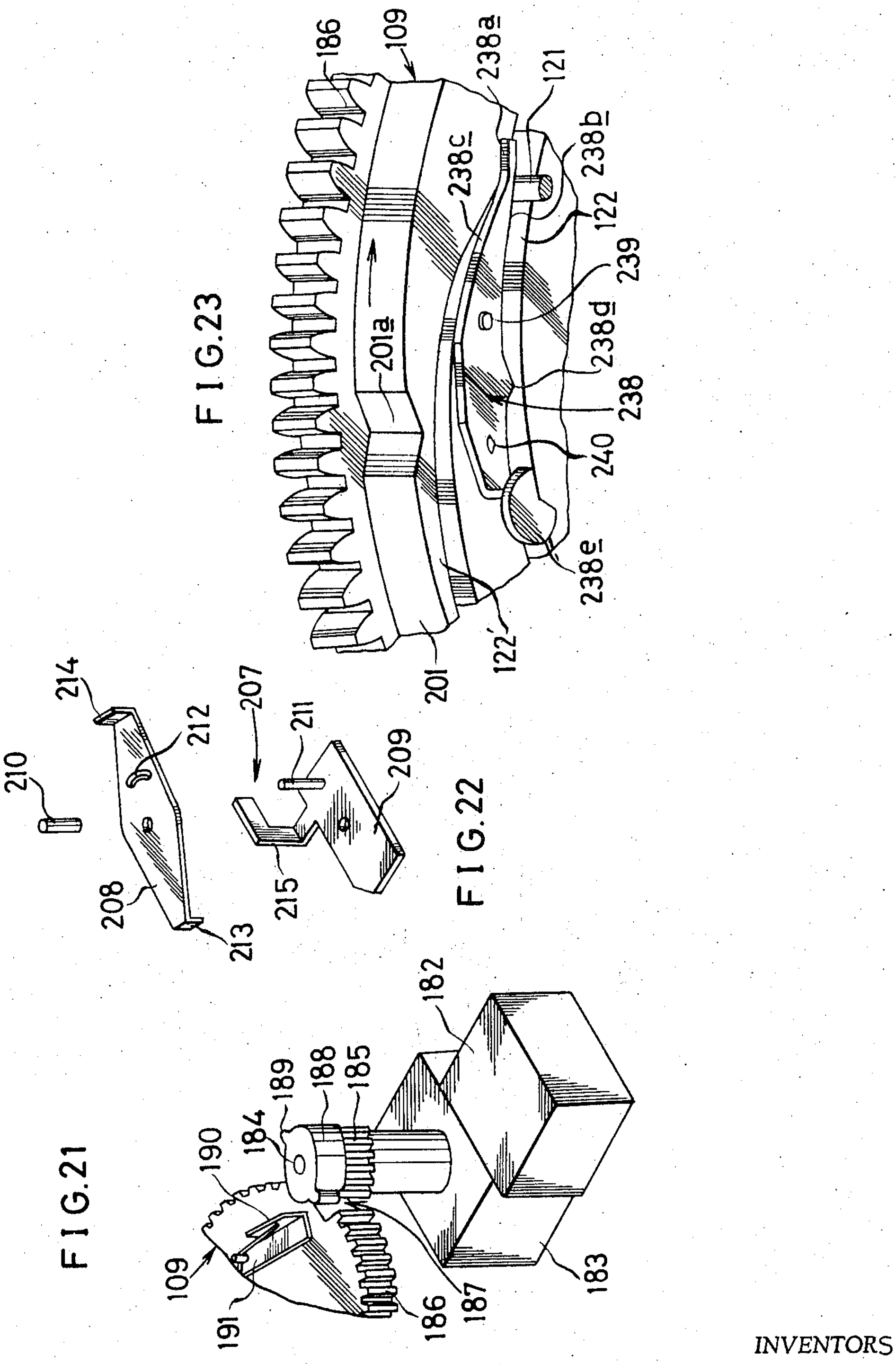
FIG. 21 is a detail perspective view of the drive provided for the change cycle control cam assembly.
FIG. 22 is an exploded perspective view of the components of a start clutch assembly for initiating rotation of the change cycle control cam assembly.
FIG. 23 is a detailed fragmentary perspective view showing a cam selecting member included in the change cycle control cam assembly.

As shown particularly on FIGS. 2, 19 and 22, the starting clutch assembly 207 includes two members 208 and 209 which are pivoted, intermediate their ends, on a pivot pin 210 projecting upwardly from cam member 109 adjacent the periphery of the latter. A pin 211 extends upwardly from lower member 209 and is slidably received in an arcuate slot 212 formed in upper member 208 for limiting the relative angular displacement of members 208 and 209. The opposite ends of clutch member 208 are bent to provide abutments 213 and 214, and the side of the lower member 209 which faces radially outward has a bent finger 215 extending therefrom. The pin 210 on which clutch assembly 207 is mounted is located on cam member 109 so that, when the latter is in its initial position for commencing a change cycle of the record changer, abutment 213 of member 208 will be disposed in the path of inward travel of surface 202*c* on start lever 202. Thus, when start lever 202 is moved to the position indicated in broken lines at 202' on FIG. 2, start clutch assembly 207 is angularly displaced to the position indicated in broken lines at 207', whereby to project abutment 214 into the path of travel of a lug or projection 216 which extends radially outward from the hub 54 of turntable 31 so as to be rotatable with the latter.

As shown particularly on FIGS. 2, 3, 15 and 16, a stop assembly 217 included in the record changer 30 according to this invention comprises a stop initiating rod 218 having a longitudinal slot 219 which slidably receives a pin 220 carried by bracket 50 for suspending rod 218 under such bracket and permitting longitudinal movement of the rod. The back end of rod 218 is formed with a downwardly bent tab 218*a* having an abutment screw 221 extending adjustably therethrough. The forward end of rod 218 is formed with a downwardly bent tab 218*b* which is loosely received in an opening 222 provided in a reset arm 223 intermediate the ends of the latter. The outer end of reset arm 223 is pivoted on pin 178, and arm 223 is formed, intermediate its ends, with an upstanding tab 223*a* (FIG. 16) which extends in back of the laterally directed arm 177*a* of the switch latch lever 177. A spring 224 (FIG. 3) extends between pin 220 and an anchor 218*c* struck from rod 218 for urging the latter in the rearward direction, and thereby moving tab or abutment 223*a* away from arm 177*a* to permit latch lever 177 to engage switch control lever 167, as previously described. However, when rod 218 is moved forwardly, the resulting pivotal movement of reset arm 223 moves abutment 223*a* forwardly against arm 177*a* of latch lever 177 to rock the latter in the counterclockwise direction, as viewed on FIG. 2, and thereby to release switch control lever 167.

The inwardly directed free end portion 223*b* of reset arm 223 extends into the lower, relatively wide portion 225*a* of an L-shaped opening 225 formed in the forward end portion of a stop member 226 provided for preventing the record-change operation of spindle assembly 33. The stop member 226 is formed with two longitudinal slots 226*a* which slidably received pins 227 carried by bridging bracket 51 for mounting stop member 226 in a manner permitting the longitudinal forward and rearward movement thereof. The back end portion of stop member 226 is formed with a vertical, downwardly opening slot 228 which, when member 226 is moved rearwardly, is aligned with a lateral extension 104*a* of bellcrank arm 104 which projects laterally through a slot 51*a* (FIG. 15) formed in bridging bracket 51. When slot 228 is thus aligned with extension 104*a* of bellcrank 101, the latter is free to rock between its positions shown in full and broken lines on FIG. 6 for effecting operation of spindle assembly 33. However, when stop member 226 is moved forwardly to the position shown on FIG. 15, slot 228 is displaced forwardly with respect to the plane of movement of extension 104*a* so that the bottom edge 226*b* of member 226 engages the top of extension 104*a* and thereby prevents angular displacement of bellcrank 101 from the position shown in full lines on FIG. 6.

The assembly 217 further includes a laterally extending control lever 229 for stop member 226 which is pivotally mounted, at its outer end, on pin 17*d*, while its inwardly directed free end portion 229*a* is received in the relatively narrow upper portion 225*b* of L-shaped slot 225 in stop member 226. Thus, stop member 226 is moved longitudinally in response to angular displacement of lever 229 about pivot pin 178. Intermediate its ends, lever 229 is formed with a forwardly directed extension 229*b* carrying an upwardly directed cam follower pin 230 engaging in a cam groove 231 (FIG. 18) defined in the underside of mode selecting cam member 171. Thus, as hereinafter described in detail, angular displacement of cam member 171 to any one of its operating mode selecting positions determines the angular position of lever 229, and hence the position of stop member 226.

Figure 18:
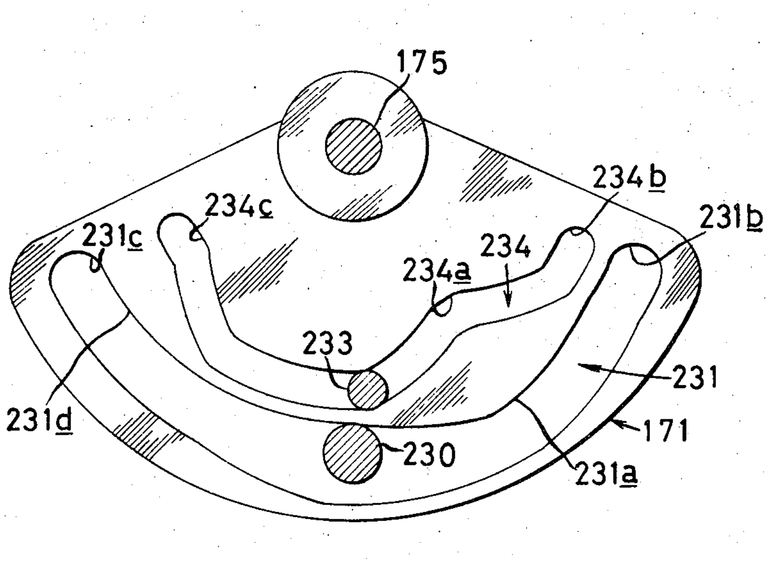

An elongated repeat control member 232 is longitudinally slidable in the forward and rearward direction between rod 218 and lever 229 and has longitudinal slots 232*a* and 232*b* in its forward and rearward portions which respectively slidably receive the lower end of shaft 175 and pin 220 for supporting member 232. A cam follower pin 233 (FIGS. 3, 15 and 16) projects upwardly from the forward portion of member 232 and engages in a cam groove 234 also defined in the underside of cam member 171 (FIG. 18). A selecting cam actuating lever 235 is pivotally mounted, intermediate its ends, on a pin 236 depending from bracket 50, and has one of its ends pivotally connected to the back end of repeat control member 232, as by a pin 237 (FIG. 16). The other end portion of lever 235 which is angled forwardly terminates in a downwardly bent abutment 235*a* projecting under the peripheral portion of cam member 109. When repeat control member 232 is in its rearmost position, lever 235 is angularly positioned as shown in full lines on FIGS. 2 and 3. However, when member 232 is moved forwardly, for example, in response to selection of the repeat mode of operation, lever 235 is displaced angularly to the position indicated in broken lines at 235' on FIG. 2 to project the abutment 235*a* thereof into the path of travel of a portion of a cam selecting member 238 which is disposed at the underside of cam member 109 and hereinafter described in detail.

Figure 20:
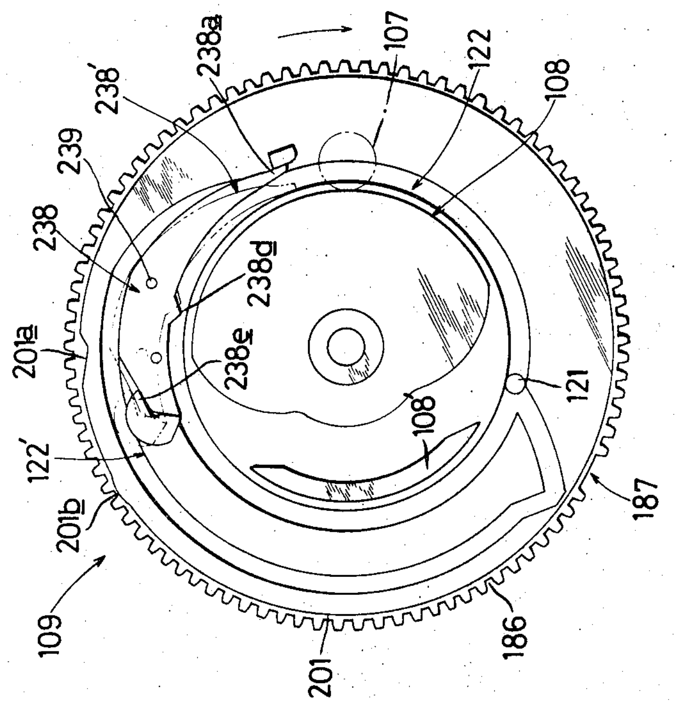
FIGS. 19 and 20 are respectively a top plan view and a bottom plan view of a record change cycle control cam assembly included in the record changer according to this invention.

As shown particularly on FIGS. 20 and 23, cam selecting member 238 is generally crescent-shaped and is pivotally mounted intermediate its ends on a pivot pin 239 which depends from the underside of cam member 109 adjacent a junction between the cam groove 122 and a bypass cam groove 122' which is also defined in the underside of cam member 109 to provide an alternate path for cam follower pin 121. When cam selecting member 238 is in the position shown on FIG. 23 and also shown in full lines on FIG. 20, the narrow end 238*a* of member 238 is disposed at the outside of cam groove 122 and blocks the entrance to bypass cam groove 122' so that the inner edge 238*b* of member 238 guides follower pin 121 to remain in cam groove 122. However, when cam selecting member 238 is shifted or angularly displaced about pivot 239 to the position indicated in broken lines at 238' on FIG. 20, end 238*a* of member 238 moves across groove 122 so as to be disposed at the inner side of the latter, and cam follower pin 121 is guided by the outer arcuate edge surface 238*c* of member 238 to move from groove 122 into the bypass cam groove 122'. As shown, the inner edge 238*b* of member 238 has a nose 238*d* projecting therefrom so as to extend partly across groove 122 when member 238 is in the position shown in full lines on FIG. 20. Thus, as nose 238*d* moves past cam follower pin 121 in groove 122, pin 121 acts on nose 238*d* to pivot member 238 to the position shown in broken lines at 238' on FIG. 20. Further, the end of member 238 remote from narrow or pointed end 238*a* is formed with a downwardly offset head 238*e* which, as member 238 moves past lever 235, and assuming that lever 235 is then in the position shown in broken lines at 235' on FIG. 2, is engaged by the abutment 235*a* of lever 235 for returning member 238 to the position shown in full lines on FIGS. 20 and 23. In order to limit the angular displacement of member 238 to the positions shown in full and broken lines on FIG. 20, a pin 240 may extend upwardly from member 238 and slidably engage in a suitably dimensioned arcuate recess (not shown) formed above member 238 in cam member 109.

In order to select the set down position of the stylus of pickup 35 on turntable 31 for the various sizes of records that may be played on changer 30, the latter includes a size selecting cam 241 rotatably mounted on shaft or pin 178 (FIGS. 2, 3 and 16) and having the knob 41 extending upwardly therefrom through the arcuate slot 42 in chassis plate 48. The periphery of cam member 241 defines cam portions 241*a*, 241*b* and 241*c* at different radial distances from the axis of pin 178, and which are selectively engageable by a cam follower pin 242 extending upwardly from the forward end portion of an elongated link 243. The forward end of link 243 has a longitudinal slot 243*a* slidably receiving pin 178, and the rearward portion of the link has a longitudinal slot 243*b* which slidably receives a mounting pin 244 depending from chassis plate 48. A spring 245 extends upwardly and forwardly from the rearward portion of link 243 to a suitable anchor at the underside of chassis plate 48 so as to urge link 243 forwardly for maintaining contact of pin 242 with the periphery of cam 241. Spring 245 also urges the rearward portion of link 243 to move upwardly along mounting pin 244 to a position at which the back end 243*c* of link 243 is interposed in the circular path of travel of a pin 246 depending from an arm 247 that extends radially from plate 145. When link 243 is in its raised position, the engagement of its back end by pin 246 limits the turning of plate 145 in the clockwise direction, as viewed on FIG. 2, and hence limits the movement of pickup 35 inwardly over a record on turntable 31, whereby to establish the setdown position of the pickup on the record. Further, it will be apparent that such set down position will be determined by the selected one of the cam parts 241*a*–241*c* engaged by pin 242 which, in turn, determines the position of link 243.

In order to free tone arm 34 for further inward swinging after pickup 35 has been set down at the selected position on a record, changer 30 further includes a deactivating lever 248 (FIGS. 2, 6, 15 and 16) which extends laterally and is pivoted, intermediate its ends, on a pivot pin 249 carried by a bracket 250 depending from chassis plate 48. The outer end of lever 248 is formed with a depending tab 251 engageable, from above, with link 243, while the inner end of lever 248 carries a cam follower pin 252 which rides on a cam surface 253 defined on the upper side of cam member 109 to control the tilting of lever 248. It will be apparent that, when lever 248 is tilted in the clockwise direction, as viewed on FIG. 6, tab 251 depresses link 243 to move the back end 243*c* thereof out of the path of travel of pin 246, and thereby to permit the free swinging of tone arm assembly 34 beyond the selected set down position.

In order to halt the sequence of record playing and changing cycles after the playing of the uppermost or last record in a stack that has been placed on spindle assembly 33, changer 30 according to this invention includes a record detecting member 254 that is tiltably mounted on the horizontal pin 112 carried by ears 113 depending from bracket 49. Detecting member 254 includes a finger 255 which, as shown particularly on FIGS. 4 and 6, extends through the aligned slots 91*b* and 96*b* of outer and inner mounting sleeves 89 and 90 of spindle assembly 33 so that the free end of finger 255 is interposed in the downward path of travel of control rod 64. Detecting member 254 further includes an L-shaped arm 256 extending generally in the opposite direction from finger 255 and ending in an upstanding portion 257 which, at its upper end, carries an abutment 258 directed radially inward under cam member 109 and being selectively engageable with head 238*e* of cam selecting member 238. As hereinafter described in detail, when the positioning of rod 64 during a record changing cycle indicates that there is at least one additional record remaining on spindle assembly 33, detecting member 254 occupies the normal position shown on FIGS. 4 and 6 in which abutment 258 is interposed in the path of travel of head 238*e* so that, as the latter moves therepast, abutment 258 causes angular displacement of cam selecting member 238 to the position shown in full lines on FIG. 20. However, when the position of rod 64 during a record changing operation indicates that the record then being lowered onto the turntable is the last record on spindle assembly 33, rod 64 acts downwardly on finger 255 to tilt detecting member 254 in the counterclockwise direction, as viewed on FIGS. 4 and 6, whereby to raise abutment 258 above the level of head 238*e* of cam selecting member 238 so that the position of the latter is undisturbed as head 238*e* moves past abutment 258.

In order to halt the rotation of turntable 31 during each record changing cycle of changer 30 without requiring the shutting off of turntable drive motor 151, changer 30 according to this invention comprises a brake assembly 259 (FIG. 2) which includes a brake actuating lever 260 pivoted, intermediate its ends, on a pivot pin 261 carried by chassis plate 48. One arm 260*a* of lever 260 extends adjacent a pin 262 which projects upwardly from lever 127 of tone arm control assembly 116 (FIGS. 2 and 14), and a spring 263 (FIG. 2) is connected between arm 260*a* and pin 262 to hold the end of the arm in engagement with pin 262. The other arm 260*b* of lever 260 is off-set downwardly to extend through an opening 264 in chassis plate 48 (FIG. 3), and the end portion of arm 260*b* extends adjacent a pin 265 which is carried by idler bellcrank 155. When lever 127 is turned clockwise from the position shown on FIG. 2 to an extreme position corresponding to the movement of tone arm assembly 34 to its rest position during a record changing cycle, pin 262 acts on arm 260*a* to turn lever 260 in the counterclockwise direction from the position shown on FIG. 2, and thereby to move arm 260*b* against pin 265 for turning idler bellcrank 155 to the position shown in full lines on FIG. 2 for disengaging idler wheel 159 from drive roller 153 and turntable skirt 53. Thus, the driving of the turntable 31 is interrupted without halting the operation of motor 151. Further, as shown, a brake supporting bellcrank 266 is also pivoted on pin 261 and carries a frictional braking member 267 at the end of one of its arms 266*a* for frictional engagement with turntable skirt 53. The other end 266*b* of bellcrank 266 has an upstanding tab 266*c* provided adjacent its end to receive an adjustable screw 268 which is held in engagement with an abutment 269 formed on lever arm 260*a* by means of a spring 270. Thus, brake supporting bellcrank 266 is urged to pivot with lever 260 so that, when the latter is angularly displaced to sidengage idler wheel 159, as described above, friction brake 267 is simultaneously applied against turntable skirt 53 for halting the rotation of the turntable.

If desired, and as shown on FIG. 5, a cue control assembly 271 may be provided for manually lifting pickup 35 from a record during the playing thereof, and then for gently lowering the pickup onto the record at any selected position on the latter. The assembly 271 is shown to include a cam 272 from which the arm 45 extends through slot 46 in chassis plate 48, and a bracket 273 depending from the chassis plate and carrying a pivot pin 274 on which cam 272 is turnable. A lift lever 275 is pivoted, intermediate its ends, on a pin 276 also carried by bracket 273 and one end of lever 275 carries a follower pin 277 engageable with the periphery of cam 272. The opposite end of lift lever 275 carries an upwardly extending adjustable screw 278 which is engageable, from below, with the sector-shaped portion 117*b* of the lift lever 117 of tone arm control assembly 116. Thus, when arm 45 is moved forwardly to engage a relatively large portion of cam 272 with pin 277, lever 275 is rocked in the counterclockwise direction, as viewed on FIG. 5, to raise screw 278 against lever portion 117*b* for elevating the latter and thereby moving lift rod 123 upwardly for raising the pickup 35 from the surface of a record on the turntable.

The configuration of the various cam grooves and cam surfaces provided on the cam members 109 and 171 will be described below with reference to FIGS. 17, 18 and 24 in the following detailed description of the various operations of the record changer 30 according to this invention.

In reparing to operate record changer 30, spindle assembly 33 is inserted, as previously described, into mounting sleeves 89 and 90, as shown on FIGS. 6 and 7, and a stack 73 of phonograph records is installed on spindle assembly 33 with the lowest record 73A of the stack being supported on the outwardly projecting upper ends 69*a* of record support fingers 69. Knobs 41 and 43 are then positioned in correspondence with the required set down position and turntable speed for the records in question. Prior to operation of changer 30 all of the various parts thereof occupy the positions shown in full lines on FIGS. 2 and 6 and the stack of records 73 is supported at an elevated record storage position which is a substantial distance $p_1$ above the turntable surface.

OPERATIONS DURING AUTOMATIC PLAYING OF SEVERAL RECORDS IN SEQUENCE

When it is desired to operate changer 30 so as to effect the automatic playing of the several records in stack 73 in sequence, the control knob 40 is moved to the position indicated at "START" on FIG. 1. The corresponding turning of operating mode selecting cam member 171 causes follower pin 169 to be engaged by a radially enlarged lateral portion 170*b* of cam surface 170, whereby lever 167 is moved to the position indicated in broken lines at 167′ on FIG. 2. Such movement of lever 167 permits closing of the contacts of switch 166 for energizing turntable drive motor 151, and also permits idler bellcrank 155 to rock to the position indicated in broken lines at 155′, whereby to engage idler wheel 159 with drive roller 153 and turntable skirt 53. Thus, rotation of the turntable is initiated. Simultaneously with the described movement of lever 167 for initiating operation of motor 151, cam follower pin 203 engages in the recessed portion 204*a* of cam surface 204 on cam member 171 so that lever 202 is rocked from the position shown in full lines on FIG. 2 to that indicated in broken lines at 202′. Such movement of lever 202 causes its end surface 202*c* to act against abutment 213 of starting clutch assembly 207 so that the latter is rocked to the position indicated in broken lines at 207′ for projecting abutment 214 into the path of travel of lug 216 extending from turntable hub 54. Thus, lug 216 hits abutment 214 and turns cam member 109 through a small angle which is sufficient to remove projection 200 of switch control lever 195 from notch 201*a* in peripheral surface 201 of cam member 109. Thus, lever 195 is rocked to the position shown in full lines on FIG. 3 to permit the closing of the contacts of switch 194 and thereby effect energization of motor 182 for driving cam member 109. Upon energizing of motor 182, pinion 185 and disc 188 are rotated but engagement of pinion 185 with gear teeth 186 on cam member 109 does not immediately occur as the gap 187 in gear teeth 186 still confronts pinion 185. However, as disc 188 is rotated, one or the other of its nodes 189 strikes abutment 190 of member 191 to further advance cam member 109, and the positioning of member 191 and of nodes 189 is selected to insure that such further advancement of cam member 109 brings its gear teeth 186 into proper meshing engagement with the teeth of pinion 185. Thereafter, rotation of cam member 109 continues with the motor 182 supplying the motive force for effecting such rotation.

In response to the further turning of cam member 109, a node or projection 201*b* extending from surface 201 of cam member 109 (FIG. 20) comes into engagement with projection 200 on lever 195 so that the latter is further turned in the counterclockwise direction, as viewed on FIG. 3, and its abutment 197 acts forwardly against screw 199 carried by lever 167 to similarly angularly displace lever 167 a further increment in the counterclockwise direction, as viewed on FIG. 2. The further angular displacement of lever 167 permits nose 180 on latch 177 to enter in front of the abutment 181 on the adjacent end of lever 167, whereby to lock the latter in the described position which permits continued operation of motor 151.

Figure 24:
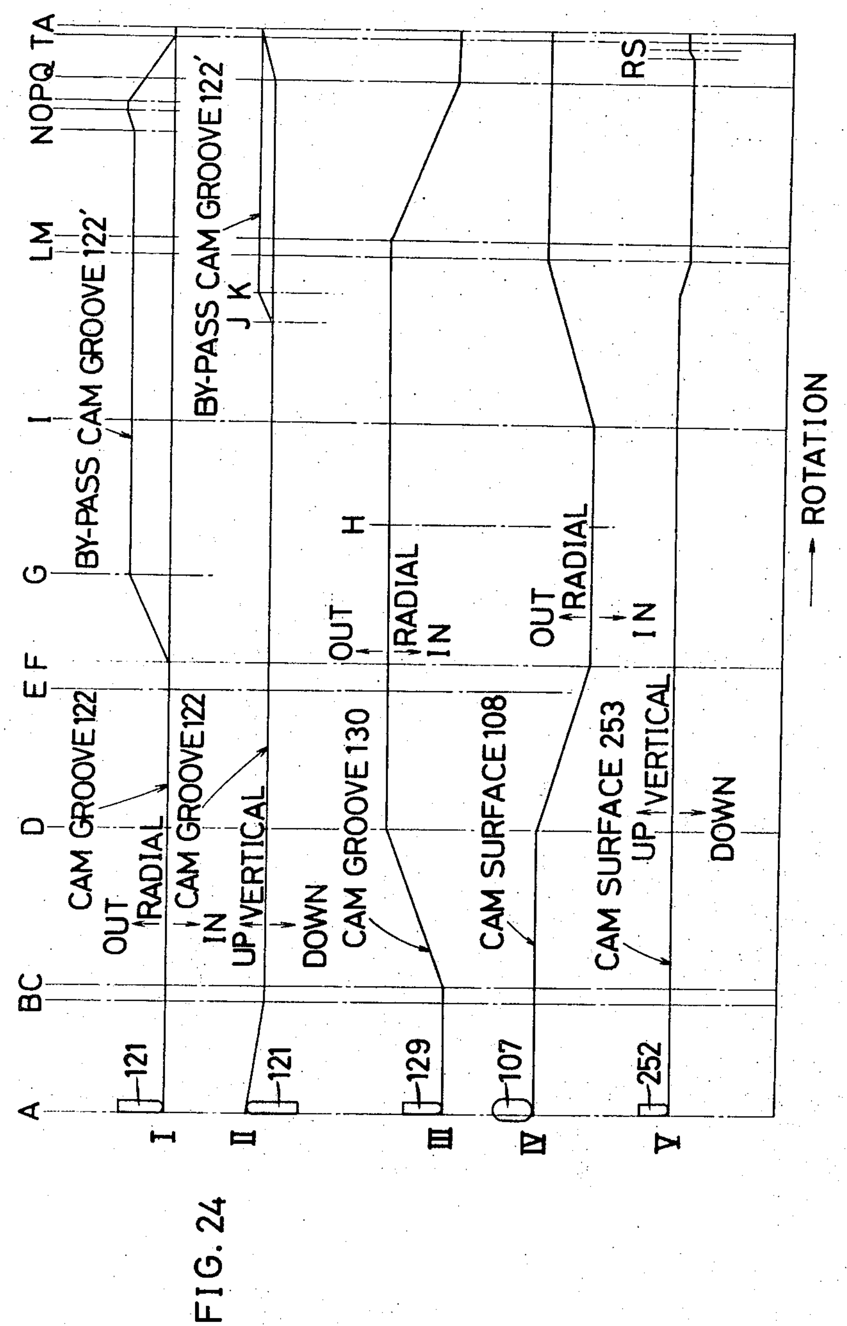
FIG. 24 — I to V are diagrammatic representations of the configurations of the various cams included in the change cycle control cam assembly.

Referring to FIG. 24-II, where A represents the initial position of cam member 109, it will be seen that the vertical configuration of cam groove 122 provides a downwardly sloping portion engaging cam follower pin 121 as cam member 109 moves from its initial position A to the position indicated at B. The engagement of such downwardly sloping portion of cam groove 122 with follower pin 121 causes tilting of lift lever 117 to the position indicated in broken lines at 117′ on FIG. 13, whereby to raise lift rod 123 for lifting tone arm assembly 34 from cradle 38 or, in the case of a record changing operation following the playing of a record, to lift pickup 35 from the surface of a record.

As previously described, the tilting of lift lever 117 for raising tone arm assembly 34 causes lever extension 133 to be depressed and thereby bring its frictional member 136 into contact with control plate 145 which is rotatably coupled with tone arm assembly 34 insofar as horizontal swinging of the latter is concerned.

As shown on FIG. 24-III, the portion of cam groove 130 engaged by cam follower pin 129 during the movement of cam member 109 from starting position A through position B to position C is at a constant, relatively small radial distance from the axis of cam member 109. However, during movement of cam member 109 from position C to position D, a portion of cam groove 130 which is of progressively increasing radial distance from the center of cam member 109 comes into engagement with cam follower pin 129 so that the latter is moved radially outward for swinging lever 127 in the clockwise direction from the position shown on FIG. 2. Such swinging of lever 127 is transmitted to lever extension 133 which, by reason of the engagement of its frictional member 136 with control plate 145 seeks to turn the latter in the counterclockwise direction, as viewed on FIG. 2. If tone arm assembly 34 is already in its rest position, as upon the commencement of operation of changer 30, further counterclockwise turning of plate 145 is prevented by the engagement of its abutment 146 with an end of slot 147 in chassis plate 48, so that frictional member 136 merely slips relative to the surface of plate 145. However, if the record changing cycle is initiated at the end of the playing of a record, as hereinafter described in detail, the engagement of cam follower pin 129 by the portion of cam groove 130 between positions C and D effects the return swinging movement of the tone arm from the radially inward position of pickup 35 at the completion of the playing of the record back to the rest position of the tone arm assembly above cradle 38.

During movement of cam member 109 from starting position A to position D, cam surface 108 thereof presents a portion thereof to cam follower roller 107 which is at a relatively large radial distance from the center of the cam member, as shown on FIG. 24-IV. Thus, during the movement of cam member 109 from position A to position D, bellcrank 101 is maintained in the position shown in full lines on FIG. 6 and, accordingly, spindle assembly 33 retains the stack of records 73 at the elevated storage position so as to avoid any interference with the previously described movements of tone arm assembly 34. However, during further movement of cam member 109 from position D through position E to position F, the portion of cam surface 108 presented to cam follower roller 107 is at a progressively decreasing radial distance from the center of cam member 109 so that bellcrank 101 is rocked from the position shown in full lines on FIG. 6 toward the position indicated in broken lines at 101′. During a major portion of such rocking of bellcrank 101, mounting sleeves 89 and 90 move downwardly together and, by reason of the connection of mounting sleeves 89 and 90 to the outer and inner sleeves 60 and 61 of spindle assembly 33, the latter also moves downwardly as a unit. Thus, the record stack 73 is moved downwardly with spindle assembly 33 to an intermediate position indicated in broken lines at 73′ on FIG. 6. In accordance with the present invention, the intermediate position to which the stack of records is moved downwardly is at a distance $p_2$ (FIG. 6) from the elevated storage position of the records which is at least substantially one-half the distance $P_1$ from the surface of turntable 31 to the elevated storage position. When the rocking of bellcrank 101 has progressed to the point where the downward movement of spindle assembly 33 as a unit has lowered the record stack to the described intermediate position, further downward movement of outer mounting sleeve 89 with the inner mounting sleeve 90 in response to continued rocking of bellcrank 101 to the position 101′ is prevented by the engagement of the upper ends 91′ of slots 91*a* and 91*b* in sleeve 89 with the diametrically opposed projections 94*a* and 94*b* on fixed bracket 49.

The downward movement of outer mounting sleeve 89 is arrested, as described, with cam member 109 at the position E on FIG. 24-IV so that, during movement of cam member 109 from position E to position F, inner mounting sleeve 90 is moved downwardly relative to outer mounting sleeve 89. By reason of the connection of outer and inner sleeves 60 and 61 of spindle assembly 33 to outer and inner mounting sleeves 89 and 90, the relative movement of the mounting sleeves effects a corresponding movement of inner sleeve 61 downwardly relative to outer sleeve 60. Such relative movement of sleeves 60 and 61 causes the outer surfaces 69*b* of fingers 69 to cam on the bottom ends 68*a* of respective slots 68 so as to retract fingers 69, as shown on FIG. 8, and thereby release the lowest record 73A to fall the relatively short distance remaining between the lowered intermediate position of the stack 73′ on FIG. 6 and the surface of turntable 31. In falling such relatively short distance, as compared with the substantial distance $p_1$ from the elevated storage position to the turntable, damage to the record will not occur and there is relatively little impact on the turntable.

By reason of spring 87 within spindle 33, rod 64 tends to follow the downward movement of inner sleeve 61 relative to outer sleeve 60, whereby the lower surface portion 86*a* of control member 85 acts outwardly on noses 84 of fingers 74 to radially expand the secondary record support means, that is, to project the bars 83 thereof radially outward through slots 68 simultaneously with the radial retraction of fingers 69 of the primary record support means. If there is at least one record on spindle assembly 33 above the lowest record 73A, for example, the next lowest record 73B shown on FIG. 8, such next lowest record 73B blocks the full radial expansion of fingers 74 so that control member 85 cannot move with inner sleeve 61 through the full displacement of the latter relative to outer sleeve 60, whereby spring 87 is compressed, and the resulting spring force causes barbs 83 to engage securely with the central hole of the next lowest record 73B for temporarily supporting the latter and any other record that may be thereabove on spindle assembly 33.

At the lowest point of downward movement of inner sleeve 61, that is, when cam member 109 reaches the position F on FIG. 24-IV, rod 64 of spindle assembly 33 projects the relatively small distance $d_1$ (FIG. 8) below the lower end of sleeve 61 by reason of the fact that the presence of the next lowest record 73B on spindle assembly 33 has blocked the full radial expansion of fingers 74 and therefore has blocked the travel of control member 85 and rod 64 downwardly with inner sleeve 61 through the full movement of the latter relative to outer sleeve 60. With rod 64 projecting the relatively small distance $d_1$ below sleeve 61 in the lowest position of the latter, the bottom end of rod 64 merely reaches to finger 255 of detecting member 254 so that the latter remains in the position shown on FIG. 6 in which its abutment 258 is at the same level as the path of travel of head 238*e* on cam selecting member 238. As cam member 109 moves from position F to position I on FIG. 24-IV, cam surface 108 presents a portion to roller 107 which is at a uniform, relatively small radial distance from the center of cam member 109 so that inner sleeve 61 of spindle assembly 33 remains at its lowermost position during such movement of cam member 109. As cam member 109 passes the position indicated at G on FIG. 24, and in which it is shown on FIG. 3, cam follower pin 121 in cam groove 122 engages nose 238*d* of cam selecting member 238 and rocks the latter to the position indicated in broken lines at 238' on FIG. 20. However, immediately thereafter, for example, with cam member 109 in the position H indicated on FIG. 24, head 238*e* of the cam selecting member is engaged by abutment 258 of detecting member 254, provided that abutment 258 is at the level of head 238*e* in response to the detection of the next lowest record 73B on spindle assembly 33, whereby cam selecting member 238 is returned to the position shown in full lines on FIG. 20.

After the lowest record 73A has been deposited on turntable 31, and particularly during the movement of cam member 109 from the position I to the position L on FIG. 24-IV, cam surface 108 presents a portion to follower roller 107 which is at progressively increasing radial distances from the center of cam member 109 so that bellcrank 101 is rocked in the clockwise direction to return from the position shown in broken lines at 101' on FIG. 6 to the position shown in full lines. During the initial portion of such rocking of bellcrank 101, sleeves 90 and 61 are raised relative to sleeves 89 and 60, whereby fingers 69 of the primary record support means are urged by the respective springs 72 to again project radially out of slots 68 to engage and support the record 73B which is then at the bottom of stack 73. When the upper end of inner sleeve 61 engages the bottom of control member 85, control member 85 thereafter moves upwardly with sleeve 61 relative to outer sleeve 60 so that spring 80 can then return fingers 74 of the secondary record support means to their normal radially retracted positions within sleeve 60. When the limit of upward movement of inner sleeve 61 relative to outer sleeve 60 has been reached, that is, when tab 63 reaches the bottom of groove 62, as on FIG. 7, further rocking of bellcrank 101 toward the position indicated in full lines on FIG. 6 effects upward movement of spindle assembly 33, as a unit, for restoring the remaining records in the stack on spindle assembly 33 to the elevated storage position shown in full lines on FIG. 6.

After spindle assembly 33 has been returned as a unit to its original position for restoring the stack of records to the elevated storage position, and more particularly, as cam member 109 moves from the position M to the position Q shown on FIG. 24, cam groove 130 presents a portion to cam follower pin 129 which is at progressively decreasing radial distances from the center of cam member 109, as shown on FIG. 24-III. Thus, lever 127 and its extension 133 are turned in the counterclockwise direction, as viewed on FIG. 2 and, by reason of the engagement of frictional member 136 with plate 145, plate 145 and tone arm assembly 34 are turned in the clockwise direction for moving pickup 35 horizontally over the record on turntable 31 in the direction toward the center of the latter. However, before such horizontal swinging of tone assembly 34 commences, and more particularly when cam member 109 reaches the position indicated at K ON FIG. 24, cam surface 253 presents a portion to cam follower pin 252 which slopes downwardly and, from cam position L to cam position R is depressed, so that deactivating lever 248 is rocked in the counterclockwise direction, as viewed on FIG. 6, to permit the rear end portion of lever 243 to be raised by spring 245. The back end 243*c* of lever 243 is thereby positioned in the path of travel of pin 246 carried by arm 247 extending from plate 145. Thus, when pickup 35 has been moved inwardly to a location above the selected set down position on the record, further inward swinging of tone arm assembly 34 is blocked by the engagement of the pin 246 with back end 243*c* of lever 243 and further counterclockwise turning of lever 127 and extension 133, as viewed on FIG. 2, results merely in slipping of frictional member 136 relative to plate 145.

During movement of cam member 109 from the position Q to the position T shown on FIG. 24, cam groove 122 presents a portion thereof to cam follower pin 121 which has a vertical configuration that rises progressively, as shown on FIG. 24-II, so that lift lever 117 is rocked thereby from the position shown in broken lines at 117' on FIG. 13 to the position shown in full lines. Thus, lift rod 123 moves downwardly and tone arm assembly 34 is lowered to contact the stylus of pickup 35 with the grooves of the record on turntable 31 at the selected set down position. During such downward movement of pickup 35 toward the record, and more particularly during the movement of cam member 109 from the position R to the station S on FIG. 24, cam surface 253 presents to cam follower pin 252 a portion which rises progressively, as shown on FIG. 24-V, so that deactivating lever 248 is rocked in the clockwise direction, as viewed on FIG. 6, for moving its abutment 251 downwardly against lever 243 and thereby depressing back end 243*c* of that lever below the path of travel of pin 246. Thus, plate 145 and tone arm assembly 34 are now free to turn beyond the set down position, that is, the stylus of pickup 35 is now free to track the grooves of the engaged record during playing of the latter.

As cam member 109 nears the completion of a single revolution, starting clutch assembly 207 passes hub 54 of turntable 31 and finger 215 of clutch member 109 is engaged by projection 216 for turning clutch assembly 207 in the clockwise direction, as viewed on FIG. 2, to the original position shown in full lines. Such return of clutch assembly 207 to its original position causes abutment 213 thereof to act against edge 202*c* of lever 202, whereby the latter is rocked back to its position shown in full ines on FIG. 2 to releast pin 203 from the depression 204*a* in cam surface 204 of mode selecting cam member 171 and the latter is free to be returned to its neutral position, as by a centering spring (not shown). However, the engagement of nose 180 of latch 177 with abutment 181 at the adjacent end of lever 167 prevents return of the latter to the position shown in full ines on FIG. 2, whereby motor 151 remains operative to drive turntable 31. Upon the completion of a single revolution of cam member 109, that is, upon the return of the latter to its original position, notch 201*a* in the periphery of cam member 109 again receives projection 200 of lever 195, whereby the latter is free to be rocked by the spring 195*a* (FIG. 3) for again moving abutment 196 against switch actuator 194*a* for depressing the latter and thereby opening the contacts of switch 194 for stopping the operation of motor 182 in the drive for cam member 109. Accordingly, rotation of cam member 109 is halted in its original psoition.

Although the motor 151 for driving turntable 31 is operative continuously during the above described record changing cycle, it will be noted that, during the movement of cam member 109 from the position D to the position M on FIG. 24, the portion of cam groove 130 presented to cam follower pin 129 is at a uniform, relatively large radial distance from the center of cam member 109 so that lever 127 is turned substantially in the clockwise direction from the position shown on FIG. 2. Such turning of lever 127 causes pin 262 thereon to act against the adjacent end of lever 260 whereby the latter is turned in the counterclockwise direction from the position shown on FIG. 2. Turning of lever 260, as previously described, serves to engage brake member 267 with turntable skirt 53 and, simultaneously, to rock idler bellcrank 155 in a direction for disengaging idler wheel 159 from drive roller 153 and turntable skirt 53. Thus, throughout the time that spindle assembly 33 is being operated to deposit a record on turntable 31, as previously described, the rotation of turntable 31 is halted for minimizing any possible damage to the record being deposited on the turntable, or to the underlying records on the turntable. However, prior to the set down of the stylus of pickup 35 on the record, as previously described, and more particularly during the movement of cam member 109 from the position M to the position Q on FIG. 24, lever 127 is returned to the position indicated on FIG. 2 and spring 263 connected between pin 262 and the adjacent end of lever 260 causes turning of the latter back to the position shown on FIG. 2 so as to disengage brake member 267 from turntable skirt 53 and, further to permit the return of idler wheel 159 to its operative position in engagement with drive roller 153 and turntable skirt 53. Thus, turntable 31 is again rotated prior to set down of the stylus of pickup 35 on the record and, by reason of the fact that the motor 151 is continuously operative and brake member 267 is mechanically applied and disengaged, the acceleration of turntable 31 back to its selected speed is rapidly achieved.

When the playing of a record has been completed, that is, when the stylus of pickup 35 traces the final or innermost grooves of the record, the corresponding positioning of tone arm assembly 34, and hence of plate 145, causes rod 150 connected to arm 148 of plate 145 to extend diametrically across cam member 109 so that end 150*a* of rod 150 then acts upon finger 215 of starting clutch assembly 207 to again dispose the latter in the position indicated in broken lines at 207' on FIG. 2. Thus, abutment 214 of the starting clutch assembly is again positioned in the path of pojection 216 on hub 54 of the turntable. Accordingly, initiation of rotation of cam member 109 is effected by the engagement of projection 216 with abutment 214, whereupon the record changing cycle of changer 30 proceeds in the same manner as has been described above.

However, in this case, since the record changing cycle starts with pickup 35 disposed radially close to the center of turntable 31, the portion of cam groove 130 acting on follower pin 129 during movement of cam member 109 from position C to position D on FIG. 24-III, that is, after lifting of the pickup from the surface of the record, is effective to cause swinging of the tone arm assembly horizontally back to its rest position.

Thus, the records in stack 73 are successively deposited on turntable 31 and played. During the record changing cycle which deposits the last of the records in stack 73 on turntable 31, that is, when no additional records remain on spindle assembly 33 other than the last record 73N which is released at the intermediate position to fall the relatively short distance onto turntable 31, as shown on FIG. 9, the absence of any additional records permits fingers 74 of the secondary record support means to be expanded to the full extent by control member 85 so that the latter and rod 64 are free to move downwardly with inner sleeve 61 through the complete downward movement of sleeve 61 relative to sleeve 60. Thus, when cam surface 108 has effected movement of bellcrank 101 to the position shown in broken lines at 101' on FIG. 6, that is, during the movement of cam member 109 from position F to position I on FIG. 24-IV, the lower end or rod 64 projects the relatively large distance $d_2$ (FIG. 9) below the lower end of inner sleeve 61 in the lowermost position of the latter. With rod 64 thus positioned relative to inner sleeve 61, the lower end of rod 64 acts downwardly on finger 255 of detecting member 254 to rock the latter in the counterclockwise direction from the position shown on FIG. 6, whereby to raise abutment 258 of detecting member 254 to a position above the level of head 238*e* on cam selecting member 238, as shown in full lines on FIG. 12. Thus, as cam member 109 moves through the position G on FIG. 24, pin 121 acts on nose 238*d* of cam selecting member 238 to move the latter to the position indicated in broken lines at 238' on FIG. 20 and, thereafter, when cam member 109 moves through position H on FIG. 24, abutment 258 does not engage head 238*e* of cam selecting member 238 so that the latter remains in the position indicated at 238' on FIG. 20 and thereby memorizes the absence of any additional records on spindle assembly 33. Thereafter, the record changing cycle proceeds in the same manner as has been described above and, at the completion of the playing of the last record, rod 150 again engages finger 215 of starting clutch assembly 207 to initiate rotation of cam member 109 and thereby start another changing cycle. The last mentioned changing cycle proceeds as before, that is, tone arm assembly 34 is raised to lift the stylus of pickup 35 from the last record and tone arm assembly 34 is then swung outwardly and returned to its rest position. However, when cam member 109 reaches the position F on FIG. 24, the positioning of cam selecting member 238 in the position indicated by broken lines at 238' on FIG. 20 causes cam follower pin 121 to enter and proceed along bypass cam groove 122', rather than continuing along cam groove 122. During movement of cam member 109 from position F to position G on FIG. 24-I, bypass cam groove 122' presents to pin 121 a portion at progressively increasing radial distances from the center of cam member 109 so that lift lever 117 is turned in the counterclockwise direction, as viewed on FIG. 3, for disposing abutment 117*c* adjacent the head of screw 221 at the back end of link 218. Thereafter, and particularly during the movement of cam member 109 from the position J to the position K indicated on FIG. 24-II, by pass cam groove 122' presents to pin 121 a portion that slopes upwardly, whereby lever 117 is tilted from the position indicated by broken lines at 117' on FIG. 13 to the position indicated in full lines so that lift rod 123 moves downwardly and tone arm assembly 34 is permitted to settle onto cradle 38 in its rest position.

As shown on FIG. 24-I, as cam member 109 moves from the position N to the position O, bypass cam groove 122' presents to pin 121 a portion that extends progressively further radially outward from the center of cam member 109, whereby lever 117 is further turned in the counterclockwise direction, as viewed on FIG. 3, and abutment 117c engaging screw 221 effects forward displacement of link 218. By reason of the connection of link 218 to reset arm 223, the latter is rocked in the clockwise direction, as viewed on FIG. 3, to move its tab or abutment 223a (FIG. 16) against latch lever 177 and thereby pivot the latter for release of its nose 180 from abutment 181 on lever 167. Thus, lever 167 is freed to be returned by spring 172 to its original position shown in full lines on FIG. 2, whereby to open the contacts of switch 166 and cause deenergization of turntable drive motor 151. However, motor 182 for driving cam member 109 continues to be energized until the cam member returns to its original position in which notch 201a receives projection 200 to permit pivoting of lever 195 by spring 195a back to its original position, in which abutment 196 acts on switch 194 to open the contacts of the latter and thereby deenergize motor 182. With the deenergization of motor 182, all of the components of changer 30 are returned to their original positions and the changer 30 is inoperative.

STOPPING OPERATION OF THE CHANGER AT ANY TIME DURING THE PLAYING OF A RECORD THEREON

When, during the playing on turntable 31 of any record in stack 73, operating mode selecting knob 40 is moved to the position indicated at "stop" on FIG. 1, the corresponding turning of mode selecting cam 171 positions a recess 204b of cam surface 205 (FIG. 17) to receive cam follower pin 203. The reception of pin 203 in recess 204b permits spring 206 to turn lever 202 from the full line position to the position indicated in broken lines at 202' on FIG. 2. The movement of lever 202 to the position indicated at 202' causes its end surface 202c to act against abutment 213 of start clutch assembly 207 for pivoting the latter to the position indicated in broken lines at 207', whereby the rotation of cam member 109 is initiated, as previously described. Further, the turning of knob 40 to the "stop" position causes cam follower pin 230 to be engaged by a portion 231b of cam groove 231 (FIG. 18) which is at a relatively smaller radial distance from shaft 175 than is the portion 231a of cam groove 231 that engages pin 230 when knob 40 is moved to the "start" position. It will be noted that, when pin 230 was engaged with cam portion 231a, as during the previously described operations of changer 30 with knob 40 at the "start" position, lever 229 was angularly positioned to dispose member 226 with its slot 228 in alignment with the extension 104a of bellcrank 101, whereby to avoid interference with the rocking of bellcrank 101 from the position shown in full lines on FIG. 6 to the position indicated in broken lines at 101'. However, when cam portion 231b engages pin 230 in response to movement of knob 40 to the "stop" position, lever 229 is rocked to move member 226 forwardly to the position shown on FIG. 15, that is, with its slot or notch 228 out of alignment with extension 104a. Accordingly, during the initial phases of the "stop" operation, changer 30 operates in the previously described manner to lift the stylus of pickup 35 from the record which was being played and to swing tone arm 34 horizontally back to its rest position. However, when cam member 109 reaches the position indicated at D on FIG. 24-IV, that is, at the point where bellcrank 101 would commence its rocking from the position shown in full lines on FIG. 6 to the position indicated in broken lines at 101' for effecting operation of spindle assembly 33, the engagement of the edge 226b of member 226 with the top edge of bellcrank extension 104a prevents such rocking of bellcrank 101 and spindle assembly 33 remains inoperative and continues to support any records remaining in stack 73 at the elevated storage position. Since cam follower roller 107 cannot move radially inward in engagement with the portion of cam surface 108 presented thereto between positions D and L on FIG. 24-IV, roller 107 engages the surface of an alternative cam portion 108' (FIGS. 3 and 20). With roller 107 being prevented from moving radially inward with respect to cam member 109, such roller 107 acts outwardly on head 238e of cam selecting member 238 as the latter moves past roller 107 and thereby turns cam selecting member 238 to the position indicated in broken lines at 238' on FIG. 20. With cam selecting member 238 in the position 238', cam follower pin 121 is constrained to move into bypass cam groove 122' when cam member 109 reaches the position F. Thereafter, the operation of changer 30 is the same as that described above for the cycle following that in which detection member 254 is positioned in response to the detection of no further records on spindle 33. Therefore, tone arm assembly 34 will be retained at its rest position and lowered onto cradle 38, whereupon turntable drive motor 151 will be deenergized and motor 182 for driving cam member 109 will also be deenergized upon the return of cam member 109 to its initial position.

REPEAT PLAYING OF ANY RECORD IN THE STACK

When it is desired to effect the repeated playing of any record from the stack 73, operating mode selected knob 40 is moved to the position indicated at "repeat" on FIG. 1 during the playing of such record. Such movement of knob 40 moves mode selecting cam 171 so as to dispose a portion 234c of its groove 234 (FIG. 18) in engagement with follower pin 233. The cam portion 234c is at a relatively small radial distance from the axis of shaft 175 so that link 232 is moved forwardly to pivot repeat lever 235 and thereby dispose the same in the position indicated by broken lines at 235' on FIG. 2 with its abutment 235a interposed in the path of travel of head 238e of cam selecting member 238.

It will be noted on FIG. 18 that cam portion 234a of groove 234 engaged by pin 233 when knob 40 is moved to the "start" position is similarly relatively close to shaft 175 and, therefore, similarly causes movement of lever 235 to the position indicated in broken lines at 235' on FIG. 2. In the case of the "start" operation of changer 30, abutment 235a of lever 235 is thus engageable with head 238e of cam selecting member 238 during the first revolution of cam member 109, that is, during the first record changing cycle, in order to insure that follower pin 121 wil not enter bypass cam groove 122' prior to the previously described engagement of follower pin 121 in the nose 238d of cam selecting member 238. Thus, if cam selecting member 238 has been disposed at the position 238' on FIG. 20 at the conclusion of the preceding operation of changer 30, the selection of the "start" operation ensures that lever 235 will return member 238 to its full line position on FIG. 20 prior to the movement of cam member 109 through position F on FIG. 24.

Returning to the description of the "repeat" operation, it will be noted on FIG. 18 that the portion 231*c* of cam groove 231 engaged by follower pin 230 in response to the movement of knob 40 to the "repeat" position is again at a relatively small radial distance from shaft 175 so that lever 229 is pivoted to move member 226 forwardly, in the same manner as when "stop" operation is selected. Thus slot 228 of member 226 is moved out of alignment with extension 104*a* of bellcrank 101, as on FIG. 15, whereby to prevent rocking of bellcrank 101 to the position indicated in broken lines at 101' on FIG. 6 so that operation of spindle assembly 33 cannot occur, in the same manner as in the described "stop" operation. However, when "repeat" operation is selected, the recessed portion 204*c* of cam surface 204 that engages follower pin 203 is at a relatively large radial distance from shaft 175, as shown on FIG. 17, so that lever 202 remains in the position shown in full lines on FIG. 2 and thus does not act on starting clutch assembly 207 to initiate rotation of cam member 109. Accordingly, the playing of the record then on turntable 31 continues following the movement of knob 40 to the "repeat" position.

When the stylus of pickup 35 traces the final grooves of the record being played, rod 150 engages finger 215 of starting clutch assembly 207, as during the normal initiation of a record changing cycle when "start" operation is selected. After the rotation of cam member 109 is thus initiated, the operating phases of changer 30 are the same as those described above in the case when "start" operation is selected until cam member 109 reaches the position D on FIG. 24. In other words, during rotation of cam member 109 from position A to position D, pickup 35 is lifted from the record and tone arm assembly 34 is swung outwardly to its rest position. However, when cam member 109 reaches position D, cam follower roller 107 is prevented from following cam surface 108 by the engagement of edge surface 226*b* of member 226 with extension 104*a* of bellcrank 101. Thus, as in the case of the "stop" operation of the changer, operation of spindle assembly 33 is prevented and the latter remains in its raised position to hold the remaining stack of records at the elevated storage position. However, in the case of "repeat" operation, the head 238*e* of cam selecting member 238 is engaged by abutment 235*a* of lever 235 in moving past the latter which is in the position indicated in broken lines at 235' on FIG. 2, and thus cam selecting member 238 is moved to the position shown in full lines on FIG. 20 to insure that follower pin 121 will continue to move along cam groove 122 and will not enter bypass cam groove 122' when cam member 109 reaches the position F on FIG. 24. Thus, during the remaining rotational movement of cam member 109 from position F back to position A on FIG. 24, the operation of changer 30 is the same as that described above for the selection of the "start" operation. Therefore, after a period of dwell at its rest position, tone arm assembly 34 is moved inwardly to a location over the selected set down position on the record and then pickup 35 is lowered onto the record to repeat the playing of the latter. From the foregoing, it will be apparent that the record changer 30 is capable of the repeated playing of any selected record even though additional records are still supported on spindle assembly 33.

OPERATION OF THE CHANGER TO STOP THE LATTER AT THE CONCLUSION OF THE PLAYING OF A RECORD AND TO PERMIT MANUAL OPERATION

When operating mode selecting knob 40 is moved to the position indicated at "manual" on FIG. 1 during the playing of a record, the corresponding movement of mode selecting cam member 171 positions a portion 231*d* of cam groove 231 (FIG. 18) for engagement with cam follower pin 230. Cam portion 231*d* is at the same radial distance from shaft 175 as cam portions 231*b* and 231*c* so that lever 229 is rocked or pivoted to move member 226 forwardly to the position shown on FIG. 15 and thereby block rocking of bellcrank 101 from the position shown in full lines to the position indicated in broken lines at 101' on FIG. 6. Thus, operation of spindle assembly 33 is prevented in the same manner as when the "stop" operation is selected. However, in the case where "manual" operation is selected, the recess 204*b* of cam surface 204 (FIG. 17) which receives follower pin 203 is relatively shallow, that is, at a relatively large radial distance from shaft 175, so that lever 202 remains in the position shown in full lines on FIG. 2 and does not actuate starting clutch assembly 207 for initiating the rotation of cam member 109. Therefore, the record being played at the moment when knob 40 is moved to "manual" position is played in its entirety and, at the completion of playing of such record, rod 150 engages finger 215 to axtuate clutch assembly 207, as previously described, whereby to initiate rotation of cam member 109. Thereafter, during the rotation of cam member 109, the operations of changer 30 are the same as those previously described for the situation where "stop" operation is selected.

On the other hand, if a record is manually placed on turntable 31 when changer 30 is inoperative, and knob 40 is moved to the "manual" position for initiating operation of changer 30, the corresponding movement of mode selecting cam member 171 will engage follower pin 169 with one of the lateral portions 170*b* of cam surface 170 so that lever 167 will be moved to the position indicated in broken lines at 167' on FIG. 2, whereby to cause operation of turntable drive motor 151 by closing of the contacts of switch 166 and also to effect movement of idler wheel 159 into engagement with drive roller 153 and turntable skirt 53, from which it follows that the turntable 31 will be rotated. However, the engagement of follower pin 203 in recess 204*b* will not be effective to move lever 202 from the position shown in full lines on FIG. 2, and thus starting clutch assembly 207 will not be actuated to initiate the oration of cam member 109. Thus, lever 117 will remain in the position shown in full lines on FIG. 13 and tone arm assembly 34 will be free to be lifted from cradle 38 and moved from its rest position to any desired set down position on the record.

After the pickup 35 is manually placed at any desired set down position on the record, the playing of the record will continue until the stylus of the picup traces the final grooves of the record and, as a result thereof, rod 150 acts against finger 215 of starting clutch assembly 207 to actuate the latter and thereby initiate rotation of cam member 109. Once the rotation of cam member 109 is initiated, the operation of changer 30 will proceed in the same manner as described above for the case where movement of knob 40 to "manual" position occurs during the playing of the record. Thus, pickup 35 will be lifted from the record and tone arm 34 will be returned to its rest position whereupon the motors 151 and 182 will be rendered inoperative and all components of the changer 30 will be restored to their original positions.

It will be apparent from the above that the described record changer 30 in accordance with this invention is capable of the sequential feeding of records from a stack 73 supported on spindle assembly 33 to turntable 31 in a manner to avoid damage to the records. The avoidance of damage to the records results from the fact that each record is dropped onto the turntable from only a relatively small distance thereabove. The dropping of the successive records through such relatively small distance has important advantages over those previously proposed changers, earlier mentioned herein and in which each record is continuously supported while being moved from the elevated storage position onto the turntable surface, in that the changer according to this invention requires less time for a record changing cycle, and in that the fingers 69 of the primary record support means are located above the record which has been dropped onto the turntable so that no problem exists as to the return of the fingers 69 to the elevated storage position.

It will be further apparent that the described changer 30 is capable of various alternative modes of operation that provide such changer with great flexibility in use. More specifically, the changer 30, as described, permits the repeated playing of any record in the stack 30 or, if desired the shutting off of the changer at the completion of the play of any selected one of the records.

Although an illustrative embodiment of this invention has been described in detail herein with reference to the accompanying drawings, it is to be understood that the invention is not limited to that precise embodiment and that various changes and modifications may be effected therein by one skilled in the art without departing from the scope or spirit of the invention.

What is claimed is:

1. A phonograph record changer comprising a chassis; a turntable rotatable on said chassis; a spindle assembly projecting upwardly from the center of said turntable and adapted to extend through the center holes of a stack of phonograph records, said spindle assembly including primary record support means engageable with the lowest record in a stack for normally supporting the latter at an elevated storage position which is a substantial distance above said turntable and secondary record support means engageable with the next to the lowest record in the stack for supporting said next record when said lowest record is separated downwardly therefrom; and spindle actuating means including means for effecting the downward movement of said primary record support means from said elevated position to an intermediate position which is spaced from said elevated position by at least substantially one-half said distance from said turntable to said elevated position, said primary record support means continuing to engage and support said lowest record during said movement from said elevated position to said intermediate position, means for releasing said primary record support means from said lowest record at said intermediate position, so that said lowest record is thereby freed to fall the remaining relatively short distance onto said turntable, and means for then returning said primary record support means to said elevated position for again engaging and supporting the lowest of any records remaining on said spindle assembly, and wherein said spindle assembly is movable vertically, as a unit, with respect to said turntable so that all records in the stack move downwardly with said lowest record upon said movement of said primary record support means from said elevated storage position to said intermediate position.

2. A phonograph record changer according to claim 1; in which said spindle assembly includes a vertically movable tubular outer sleeve within which said primary and secondary record support means are mounted and having apertures through which said primary and secondary record support means can project for their engagement with said lowest and next lowest records, respectively, on said outer sleeve, an inner tubular sleeve within said outer sleeve movable vertically to a limited extent relative to said outer sleeve and having said primary record support means connected to said inner sleeve, means for releasing said primary record support means from said lowest record in response to limited downward movement of said inner sleeve with respect to said outer sleeve, a central control rod within said inner sleeve movable vertically to a limited extent relative to said inner sleeve, spring means urging said rod to move downwardly with said inner sleeve, and means on said rod engageable with said secondary record support means to urge the latter to engage said next record in response to movement of said rod with said inner sleeve during said limited downward movement of said inner sleeve relative to said outer sleeve.

3. A phonograph record changer according to claim 2; in which said apertures of the outer sleeve are in the form of vertically elongated slots, said primary record support means includes a first record support finger for each of said slots pivotally connected to said inner sleeve and resiliently urged to project outwardly through the lowest part of the respective slot for engagement with said lowest record, said means to release the primary record support means includes a surface on each said first finger engageable with the bottom end of the respective slot to retract said first finger into said outer sleeve in response to said limited downward movement of said inner sleeve relative to the outer sleeve, and said secondary record support means includes a second record support finger for each of said slots connected with said outer sleeve and being resiliently retracted within the latter, said means on said rod urging each said second finger to extend outwardly through the respective slot above the corresponding first finger in response to said movement of the rod with said inner sleeve relative to said outer sleeve.

4. A phonograph record changer according to claim 1; in which said spindle actuating means includes means operative simultaneously with the release of said primary record support means from said lowest record for yieldably urging said secondary record support means to expand radially to a full extent greater than the size of said center holes of the records so that the expansion of said secondary record support means to said full extent is blocked if there is a record on said spindle assembly next above said lowest record, whereby such next record is supported by said secondary record support means; and further comprising a tone arm carrying a pickup and being movably mounted on said chassis, tone arm actuating means operative at the completion of the playing of a record on said turntable to lift said pickup from the record and return said pickup to a rest position disposed radially outward from said turntable and, after operation of said spindle actuating means, to move said pickup to a predetermined set down position on the uppermost record on said turntable, detecting means for detecting the expansion of said secondary record support means to said full extent indicating the absence of any record on said spindle assembly above said lowest record during an operation of said spindle actuating means, and means conditioned by said detecting means detecting the expansion of said secondary record support means to said full extent for interrupting the movement of said tone arm by the operation of said tone arm actuating means with said pickup at said rest position following the completion of playing of the last record on said turntable.

5. A phonograph record changer according to claim 4; further comprising drive means including an electric motor for rotating said turntable, and shut off means for stopping the operation of said motor upon the operation of the tone arm actuating means being interrupted with said pickup at its rest position.

6. A phonograph record changer according to claim 1; further comprising drive means for rotating said turntable including an electric motor and means for transmitting the rotation of said motor to said turntable including idler means moveable between an operative position and an inoperative position, and actuating means for said idler means operative during each operation of said spindle actuating means to move said idler means from said operative position to said inoperative position so that the rotational drive of said turntable is interrupted without halting the operation of said electric motor.

7. A phonograph record changer according to claim 6; further comprising mechanically actuated brake means moved simultaneously with the movement of said idler means to said inoperative position for engaging said turntable and thereby arresting the rotation of the latter.

8. A phonograph record changer according to claim 7; further comprising a tone arm carrying a pickup and being movably mounted on said chassis; tone arm actuating means operative at the completion of the playing of a record on said turntable to lift said pickup from the record and return said pickup to a rest position disposed radially outward from said turntable and, after operation of said spindle actuating means, to move said pickup to a predetermined set down position on the uppermost record on said turntable, said tone arm actuating means including a rotatable cam member carried by said chassis and defining first cam means, tone arm actuating members engageable with said tone arm and carrying cam follower means engaging said first cam means to effect vertical and horizontal movements of said tone arm in response to rotation of said cam member, and means to initiate the rotation of said cam member through a complete revolution in response to said completion of the playing of a record; and in which said brake means includes a brake actuating lever carrying a brake member and being normally urged to a position where said brake member is disengaged from said turntable, and means on one of said tone arm actuating members engageable with said brake actuating lever to displace the latter for engaging said brake member with said turntable when said one tone arm actuating member is at a position corresponding to said rest position of said tone arm.

9. A phonograph record changer according to claim 8; in which said spindle actuating means includes second cam means on said rotatable cam member, and a spindle actuating member connected with said spindle assembly and carrying a cam follower engaging said second cam means, said second cam means being shaped to cause the operation of said spindle assembly when said cam member is rotationally positioned to cause said first cam means to dispose said tone arm at said rest position.

10. A phonograph record changer according to claim 8; in which said actuating means for said idler means includes said brake actuating lever which causes movement of said idler means to said inoperative position simultaneously with the engagement of said brake member with said turntable.

11. A phonograph record changer according to claim 1; further comprising a tone arm carrying a pickup and being movably mounted on said chassis, tone arm actuating means operative to lift said pickup from a record on said turntable and return said pickup to a rest position disposed radially outward from said turntable and thereafter to move said pickup to a predetermined set down position on the uppermost record on said turntable, detecting means rendered operative by the absence of any records on said spindle assembly above a record being released by said primary record support means, operating mode selecting means selectively movable from a neutral position to at least first and second operating positions, drive means operative to rotate said turntable, means rendering said drive means operative in response to movement of said mode selecting means to either of said first and second operating positions, a rotatable cam member, cam member drive means rendered operative by initial rotation of said turntable, after movement of said mode selecting means to said first position, to effect a complete revolution of said cam member, first cam means on said cam member for operating said tone arm actuating means in response to said revolution of said cam member, second cam means on said cam member for operating said spindle actuating means while said tone arm actuating means disposes said tone arm at said rest position, means operative at the completion of playing of each record on said turntable to again cause operation of said cam member drive means, means conditioned by the movement of said mode selecting means to said second position during playing of a record for interrupting the movement of said tone arm by said tone arm actuating means with said pickup at said rest position in response to a subsequent revolution of said cam member and for shutting off said turntable drive means at the completion of said revolution irrespective of the condition of said detecting means, and means conditioned by the movement of said mode selecting means to said first position and in response to said detecting means being made operative for interrupting the movement of said tone arm by said tone arm actuating means with said pickup in said rest position in response to a subsequent revolution of said cam member and for shutting off said turntable drive means at the completion of said revolution.

12. A phonograph record changer according to claim 11; in which said mode selecting means is further selectively movable to a third operating position, and means conditioned by the movement of said mode selecting means to said third position and being operative during a subsequent revolution of said cam member to prevent operation of said spindle actuating means independent of the condition of said detecting means, whereby to permit repeated playing of any record in a stack of records on said spindle assembly.

13. A phonograph record changer according to claim 12; in which said mode selecting means is further selectively movable to a fourth operating position, and means conditioned by movement of said mode selecting means to said fourth position during playing of a record for immediately causing operation of said cam member drive means and for preventing operation of said spindle actuating means during the resulting revolution of said cam member and shutting off said turntable drive means at the completion of said revolution.

14. A phonograph record changer according to claim 13; in which said first cam means on the cam member includes a first cam groove for controlling the vertical movements of said pickup and a second cam groove for controlling the horizontal movements of said pickup; and said tone arm actuating means includes a tone arm lifter engageable with said tone arm, a tiltable lever carrying a cam follower engageable in said first cam groove, said tiltable lever engaging said tone arm lifter to establish the vertical position of said pickup in dependence on said first cam groove, a lever assembly carrying a cam follower engaging in said second cam groove and being horizontally swingable in dependence on said second cam groove, disengageable coupling means between said lever assembly and said tone arm so that the latter is affected by horizontal swinging of said lever assembly only when said coupling means is engaged, and means responsive to tilting of said tiltable lever to control the engagement of said coupling means.

15. A phonograph record changer according to claim 14; in which said cam member further has a by-pass cam groove around a portion of said first cam groove, and a cam groove selecting member movable between a first position in which said cam follower on the tiltable lever is prevented from entering said by-pass groove and a second position in which said cam follower on the tiltable lever is directed into said by-pass groove; and in which said by-pass groove has a portion to tilt said tiltable lever for disengaging said coupling means, and thereby interrupting the horizontal movement of said tone arm with said pickup in said rest position.

16. A phonograph record changer comprising a chassis; a turntable rotatable on said chassis; a spindle assembly projecting upwardly from the center of said turntable and adapted to extend through the center holes of a stack of phonograph records, said spindle assembly including primary record support means engageable with the lowest record in a stack for normally supporting the latter at an elevated storage position which is a substantial distance above said turntable and secondary record support means engageable with the next to the lowest record in the stack for supporting said next record when said lowest record is separated downwardly therefrom; and spindle actuating means including means for effecting the downward movement of said primary record support means from said elevated position to an intermediate position which is spaced from said elevated position by at least substantially one-half said distance from said turntable to said elevated position, said primary record support means continuing to engage and support said lowest record during said movement from said elevated position to said intermediate position, means for releasing said primary record support means from said lowest record at said intermediate position, so that said lowest record is thereby freed to fall the remaining relatively short distance onto said turntable, and means for then returning said primary record support means to said elevated position for again engaging and supporting the lowest of any records remaining on said spindle assembly, and wherein said spindle actuating means includes means operative simultaneously with the release of said primary record support means from said lowest record for yieldably urging said secondary record support means to expand radially to a full extent greater than the size of said center holes of the records so that the expansion of said secondary record support means to said full extent is blocked if there is a record on said spindle assembly next above said lowest record, whereby such next record is supported by said secondary record support means; and further including a tone arm carrying a pickup and being movably mounted on said chassis, tone arm actuating means operative at the completion of the playing of a record on said turntable to lift said pickup from the record and return said pickup to a rest position disposed radially outward from said turntable and, after operation of said spindle actuating means, to move said pickup to a predetermined set down position on the uppermost record on said turntable, detecting means for detecting the expansion of said secondary record support means to said full extent indicating the absence of any record on said spindle assembly above said lowest record during an operation of said spindle actuating means, and means conditioned by said detecting means detecting the expansion of said secondary record support means to said full extent for interrupting the movement of said tone arm by the operation of said tone arm actuating means with said pickup at said rest position following the completion of playing of the last record on said turntable, and wherein said spindle assembly further includes a tubular outer sleeve within which said primary and secondary record support means are mounted and having apertures through which said primary and secondary record support means can project for supporting said lowest and next lowest records, respectively, on said outer sleeve, an inner sleeve within said outer sleeve movable vertically to a limited extent relative to said outer sleeve and having said primary record support means connected to said inner sleeve, means for retracting said primary record support means in response to limited downward movement of said inner sleeve relative to said outer sleeve, a central control rod within said inner sleeve movable vertically to a limited extent relative to said inner sleeve and being yieldably urged to move downwardly with said inner sleeve, said means for urging said secondary record support means to radially expand includes means on said control rod engageable with said secondary record support means for urging the latter to expand to said full extent in response to movement of said rod with said inner sleeve through all of said limited downward movement of said inner sleeve relative to said outer sleeve, said downward movement of said rod with said inner sleeve being restricted when the expansion of said secondary record support means to said full extent is blocked; said spindle actuating means, when operative, effects said limited downward movement of said inner sleeve relative to said outer sleeve and then returns said inner sleeve upwardly relative to said outer sleeve, and said detecting means is engageable by said rod to sense the position of the latter relative to said inner sleeve at the conclusion of said limited downward movement of said inner sleeve relative to said outer sleeve.

17. A phonograph record changer comprising a chassis, a turntable rotatable on said chassis for supporting a record during the playing thereof, a tone arm carrying a pickup and being movably mounted on said chassis, a spindle assembly projecting upwardly from the center of said turntable and adopted to extend through the center holes of a stack of phonograph records, said spindle assembly including primary record support means which are normally radially expanded to engage and support the lowest record in a stack at an elevated storage position and secondary record support means disposed above said primary record support means and being normally radially retracted, spindle actuating means operative sequentially upon the completion of the playing of a record on said turntable to retract said primary record support means and simultaneously to yieldably urge said secondary record support means to expand radially to a full extent greater than the size of said center holes of the records, and then to return said primary and secondary record support means to their normal radially expanded and retracted conditions, respectively, so that, when said primary record support means are retracted, the lowest record of a stack is released thereby for movement downwardly onto said turntable and the simultaneous expansion of said secondary record support means to said full extent is blocked if there is a record on said spindle assembly next above said lowest record, whereby such next record is supported by said secondary record support means until said return of the primary record support means to said normal expanded condition thereof, detecting means for detecting the expansion of said secondary record support means to said full extent indicating the absence of any record on said spindle assembly above said lowest record during an operation of said spindle actuating means, tone arm actuating means operative at the completion of the playing of each record on said turntable to lift said pickup from the record and return said pickup to a rest position disposed radially outward from said turntable and, after operation of said spindle actuating means, to move said pickup to a predetermined set down position on the uppermost record on said turntable, and means conditioned by said detecting means detecting the expansion of said secondary record support means to said full extent for interrupting the movement of said tone arm in response to the operation of said tone arm actuating means with said pickup at said rest position following the completion of playing of the last record on said turntable, and wherein said spindle assembly includes a tubular outer sleeve within which said primary and secondary record support means are mounted and having apertures through which said primary and secondary record support means can project for supporting said lowest and next lowest records, respectively, on said outer sleeve, an inner sleeve within said outer sleeve movable vertically to a limited extent relative to said outer sleeve and having said primary record support means connected to said inner sleeve, means for retracting said primary record support means in response to limited downward movement of said inner sleeve relative to said outer sleeve, a central control rod within said inner sleeve movable vertically to a limited extent relative to said inner sleeve and being yieldably urged to move downwardly with said inner sleeve, and means on said control rod engageable with said secondary record support means for urging the latter to expand to said full extent in response to movement of said rod with said inner sleeve through all of said limited downward movement of said inner sleeve relative to said outer sleeve, said downward movement of said rod with said inner sleeve being restricted when the expansion of said secondary record support means to said full extent is blocked; and in which said spindle actuating means, when operative, effects said limited downward movement of the inner sleeve relative to said outer sleeve and then returns said inner sleeve upwardly relative to said outer sleeve, and said detecting means is engageable by said rod to sense the position of the latter relative to said inner sleeve at the conclusion of said limited downward movement of the inner sleeve relative to the outer sleeve.

18. A phonograph record changer according to claim 17; in which said secondary record support means includes fingers aligned with at least certain of said apertures and being connected with said outer sleeve, and spring means urging said fingers to retracted positions within said outer sleeve; and in which said means on the control rod includes a cam member having a lower surface portion inclined upwardly away from the axis of said rod and engageable by said fingers to project the latter through the respective apertures in response to the downward movement of said rod with said inner sleeve relative to said outer sleeve, and an upper surface portion extending from the top of said lower surface portion parallel with said axis and being engageable with said fingers to expand the latter to said full extent in response to movement of said rod with said inner sleeve through all of said limited downward movement of said inner sleeve relative to said outer sleeve.

19. A phonograph record changer comprising a chassis; a turntable rotatable on said chassis; a spindle assembly projecting upwardly from the center of said turntable and adapted to extend through the center holes of a stack of phonograph records, said spindle assembly including primary record support means engageable with the lowest record in a stack for normally supporting the latter at an elevated storage position which is a substantial distance above said turntable and secondary record support means engageable with the next to the lowest record in the stack for supporting said next record when said lowest record is separated downwardly therefrom; and spindle actuating means including means for effecting the downward movement of said primary record support means from said elevated position to an intermediate position which is spaced from said elevated position by at least substantially one-half said distance from said turntable to said elevated position, said primary record support means continuing to engage and support said lowest record during said movement from said elevated position to said intermediate position, means for releasing said primary record support means from said lowest record at said intermediate position, so that said lowest record is thereby freed to fall the remaining relatively short distance onto said turntable, and means for then returning said primary record support means to said elevated position for again engaging and supporting the lowest of any records remaining on said spindle assembly, and further including a tone arm carrying a pickup and being movably mounted on said chassis, tone arm actuating means operative to lift said pickup from a record on said turntable and return said pickup to a rest position disposed radially outward from said turntable and thereafter to move said pickup to a predetermined set down position on the uppermost record on said turntable, detecting means rendered operative by the absence of any records on said spindle assembly above a record being released by said primary record support means, operating mode selecting means selectively movable from a neutral position to at least first and second operating positions, drive means operative to rotate said turntable, means rendering said drive means operative in response to movement of said mode selecting means to either of said first and second operating positions, a rotatable cam member, cam member drive means rendered operative by initial rotation of said turntable, after movement of said mode selecting means to said first position, to effect a complete revolution of said cam member, first cam means on said cam member for operating said tone arm actuating means in response to said revolution of said cam member, second cam means on said cam member for operating said spindle actuating means while said tone arm actuating means disposes said tone arm at said rest position, means operative at the completion of playing of each record on said turntable to again cause operation of said cam member drive means, means conditioned by the movement of said mode selecting means to said second position during playing of a record for interrupting the movement of said tone arm by said tone arm actuating means with said pickup at said rest position in response to a subsequent revolution of said cam member and for shutting off said turntable drive means at the completion of said revolution irrespective of the condition of said detecting means, and means conditioned by the movement of said mode selecting means to said first position and in response to said detecting means being made operative for interrupting the movement of said tone arm by said tone arm actuating means with said pickup in said rest position in response to a subsequent revolution of said cam member and for shutting off said turntable drive means at the completion of said revolution, said mode selecting means being further selectively movable to a third operating position, and means conditioned by the movement of said mode selecting means to said third position and being operative during a subsequent revolution of said cam member to prevent operation of said spindle actuating means independent of the condition of said detecting means, whereby to permit repeated playing of any record in a stack of records on said spindle assembly, said mode selecting means being still further selectively movable to a fourth operating position, and means conditioned by movement of said mode selecting means to said fourth position during playing of a record for immediately causing operation of said cam member drive means and for preventing operation of said spindle actuating means during the resulting revolution of said cam member and shutting off said turntable drive means at the completion of said revolution, said first cam means on the cam member including a first cam groove for controlling the vertical movements of said pickup and a second cam groove for controlling the horizontal movements of said pickup; and said tone arm actuating means including a tone arm lifter engageable with said tone arm, a tiltable lever carrying a cam follower engageable in said first cam groove, said tiltable lever engaging said tone arm lifter to establish the vertical position of said pickup in dependence on said first cam groove, a lever assembly carrying a cam follower engaging in said second cam groove and being horizontally swingable in dependence on said second cam groove, disengageable coupling means between said lever assembly and said tone arm so that the latter is affected by horizontal swinging of said lever assembly only when said coupling means is engaged, and means responsive to tilting of said tiltable lever to control the engagement of said coupling means, said cam member further having a by-pass cam groove around a portion of said first cam groove, and a cam groove selecting member movable between a first position in which said cam follower on the tiltable lever is prevented from entering said by-pass groove and a second position in which said cam follower on the tiltable lever is directed into said by-pass groove, said by-pass groove having a portion to tilt said tiltable lever for disengaging said coupling means, and thereby interrupting the horizontal movement of said tone arm with said pickup in said rest position, said tiltable lever also being horizontally swingable in dependence upon the radial shape of said first cam groove and said by-pass groove; and said means to shut off said turntable drive means being operated in response to horizontal swinging of said tiltable lever in correspondence with a portion of said by-pass groove.

20. A phonograph record changer comprising a chassis, a turntable rotatable on said chassis for supporting a record during the playing thereof, a spindle assembly projecting upwardly from the center of said turntable and adopted to extend through the center holes of a stack of records, said spindle assembly normally supporting a stack of records thereon at an elevated storage position above said turntable and being operative to release the lowest record in the stack for downward movement onto said turntable, spindle actuating means for operating said spindle assembly, a tone arm carrying a pickup and being movably mounted on said chassis, tone arm actuating means operative to lift said pickup from a record on said turntable and return said pickup to a rest position disposed radially outward from said turntable and thereafter to move said pickup to a predetermined set down position on the uppermost record on said turntable detecting means rendered operative by the absence of any records above said turntable on said spindle assembly, operating mode selecting means selectively movable from a neutral position to at least first and second operating positions, drive means operative to rotate said turntable, means rendering said drive means operative in response to movement of said mode selecting means to either of said first and second operating positions, a rotatable cam member, cam member drive means rendered operative by initial rotation of said turntable, after movement of said mode selecting means to said first position, to effect a complete revolution of said cam member, first cam means on said cam member for operating said tone arm actuating means in response to said revolution of said cam member, second cam means on said cam member for operating said spindle actuating means while said tone arm actuating means disposes said tone arm at said rest position, means operative at the completion of playing of each record on said turntable to again cause operation of said cam member drive means, means conditioned by the movement of said mode selecting means to said second position during playing of a record for interrupting the movement of said tone arm by said tone arm actuating means with said pickup at said rest position in response to a subsequent revolution of said cam member and for shutting off said turntable drive means at the completion of said revolution irrespective of the condition of said detecting means, and means conditioned by the movement of said mode selecting means to said first position and in response to said detecting means being made operative for interrupting the movement of said tone arm by said tone arm actuating means with said pickup in said rest position in response to a subsequent revolution of said cam member and for shutting off said turntable drive means at the completion of said revolution, said mode selecting means being further selectively movable to a third operating position, and means conditioned by the movement of said mode selecting means to said third position and being operative during a subsequent revolution of said cam member to prevent operation of said spindle actuating means independent of the condition of said detecting means, whereby to permit repeated playing of any record in a stack of records on said spindle assembly, said mode selecting means being still further selectively movable to a fourth operating position, and means conditioned by movement of said mode selecting means to said fourth position during playing of a record for immediately causing operation of said cam member drive means and for preventing operation of said spindle actuating means during the resulting revolution of said cam member and shutting off said turntable drive means at the completion of said revolution, said first cam means on the cam member including a first cam groove for controlling the vertical movements of said pickup and a second cam groove for controlling the horizontal movements of said pickup, said tone arm actuating means including a tone arm lifter engageable with said tone arm, a tiltable lever carrying a cam follower engageable in said first cam groove, said tiltable lever engaging said tone arm lifter to establish the vertical position of said pickup in dependence on said first cam groove, a lever assembly carrying a cam follower engaging in said second cam groove and being horizontally swingable in dependence on said second cam groove, disengageable coupling means between said lever assembly and said tone arm so that the latter is affected by horizontal swinging of said lever assembly only when said coupling means is engaged and means responsive to tilting of said tiltable lever to control the engagement of said coupling means, said cam member further having a by-pass cam groove around a portion of said first cam groove, and a cam groove selecting member movable between a first position in which said cam follower on the tiltable lever is prevented from entering said by-pass groove and a second position in which said cam follower on the tiltable lever is directed into said by-pass groove, said by-pass groove having a portion to tilt said tiltable lever for disengaging said coupling means, and thereby interrupting the horizontal movement of said tone arm with said pickup in said rest position, said tiltable lever also being horizontally swingable in dependence upon the radial shape of said first cam groove and said by-pass groove, said means to shut off said turntable drive means being operated in response to horizontal swinging of said tiltable lever in correspondence with a portion of said by-pass groove.

21. A phonograph record changer comprising a chassis; a turntable rotatable on said chassis; a spindle assembly projecting upwardly from the center of said turntable and adapted to extend through the center holes of a stack of phonograph records, said spindle assembly including primary record support means engageable with the lowest record in a stack for normally supporting the latter at an elevated storage position which is a substantial distance above said turntable, secondary record support means engageable with the next to the lowest record in the stack for supporting said next record when said lowest record is separated downwardly therefrom and a vertically movable tubular outer sleeve within which said primary and secondary record support means are mounted and having apertures through which said primary and secondary record support means can project for their engagement with said lowest and next lowest records, respectively; and spindle actuating means including means for effecting the downward movement of said outer sleeve and said primary record support means from said elevated position to an intermediate position which is spaced from said elevated position by at least substantially one-half said distance from said turntable to said elevated position, said primary record support means continuing to engage and support said lowest record during said movement from said elevated position to said intermediate position, means for releasing said primary record support means from said lowest record at said intermediate position, so that said lowest record is thereby freed to fall the remaining relatively short distance onto said turntable, and means for then returning said outer sleeve and said primary record support means to said elevated position for again engaging and supporting the lowest of any records remaining on said spindle assembly.

* * * * *